(12) United States Patent
Zhou et al.

(10) Patent No.: US 11,063,934 B2
(45) Date of Patent: Jul. 13, 2021

(54) INFORMATION PUSHING METHOD, SERVER, SHARER CLIENT AND THIRD-PARTY CLIENT

(71) Applicant: ADVANCED NEW TECHNOLOGIES CO., LTD., Grand Cayman (KY)

(72) Inventors: Jianbo Zhou, Hangzhou (CN); Yibin Xiong, Hangzhou (CN); Chao Xiu, Hangzhou (CN); Ming Wu, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 370 days.

(21) Appl. No.: 16/152,194

(22) Filed: Oct. 4, 2018

(65) Prior Publication Data

US 2019/0037400 A1 Jan. 31, 2019

Related U.S. Application Data

(63) Continuation of application No. 15/326,908, filed as application No. PCT/CN2015/084338 on Jul. 17, 2015, now Pat. No. 10,136,317.

(30) Foreign Application Priority Data

Aug. 8, 2014 (CN) .......................... 201410389741.3

(51) Int. Cl.
*H04W 4/06* (2009.01)
*H04W 68/00* (2009.01)
(Continued)

(52) U.S. Cl.
CPC ...... *H04L 63/0853* (2013.01); *H04L 63/0876* (2013.01); *H04L 63/10* (2013.01);
(Continued)

(58) Field of Classification Search
CPC ..... H04W 12/06; H04W 12/08; H04W 76/14; H04W 4/80; H04W 84/12; H04L 63/0876; H04L 63/10; H04L 67/26; H04L 61/6022
See application file for complete search history.

(56) References Cited

U.S. PATENT DOCUMENTS 7,535,880 B1 * 5/2009 Hinman ............ H04W 12/0806
370/338
8,370,461 B2 2/2013 Zhong
(Continued)

FOREIGN PATENT DOCUMENTS

| CN | 101605329 A | 12/2009 |
|---|---|---|
| CN | 201608904 U | 10/2010 |

(Continued)

OTHER PUBLICATIONS

Search Report for Chinese Application No. 2014103897413, dated Apr. 3, 2018, 2 pages.
(Continued)

*Primary Examiner* — Techane Gergiso

(57) ABSTRACT

Disclosed in an embodiment of the present application is an information pushing method, comprising: a wireless network sharer client obtaining a first identifier of a wireless network selected from a wireless network list scanned/stored by a wireless network sharer terminal, and sending the same to a server; the server generating a second identifier and sending the same to the wireless network sharer client; the wireless network sharer changing the first identifier of the wireless network into a third identifier based on the second identifier; the wireless network sharer client obtaining a wireless network list updated by a wireless network sharer mobile terminal and sending the third identifier of the selected wireless network in the list to the server; and the server comparing the second identifier with the third iden-
(Continued)

tifier, and allowing successful authentication when the two identifiers are consistent, and registering information about the devices of the wireless network.

20 Claims, 12 Drawing Sheets

(51) Int. Cl.
| | |
|---|---|
| *H04W 12/06* | (2021.01) |
| *H04W 76/14* | (2018.01) |
| *H04W 4/80* | (2018.01) |
| *H04W 84/12* | (2009.01) |
| *H04L 29/06* | (2006.01) |
| *H04L 29/08* | (2006.01) |
| *H04L 29/12* | (2006.01) |

(52) U.S. Cl.
CPC .............. *H04L 67/26* (2013.01); *H04W 4/06* (2013.01); *H04W 12/06* (2013.01); *H04W 68/00* (2013.01); *H04L 61/6022* (2013.01); *H04W 4/80* (2018.02); *H04W 76/14* (2018.02); *H04W 84/12* (2013.01)

(56) References Cited

U.S. PATENT DOCUMENTS

| | | | |
|---|---|---|---|
| 8,781,965 B2 | 7/2014 | Huster | |
| 8,887,258 B2 | 11/2014 | Berione et al. | |
| 9,699,485 B2 | 7/2017 | Marlow et al. | |
| 10,136,317 B2 | 11/2018 | Zhou et al. | |
| 10,410,251 B2* | 9/2019 | Jabara | G07F 17/3218 |
| 2004/0049699 A1* | 3/2004 | Griffith | H04L 63/1425 726/23 |
| 2005/0055578 A1* | 3/2005 | Wright | G06F 21/604 726/4 |
| 2005/0208926 A1 | 9/2005 | Hamada | |
| 2006/0045272 A1 | 3/2006 | Ohaka | |
| 2006/0153122 A1* | 7/2006 | Hinman | H04L 67/04 370/328 |
| 2006/0161635 A1 | 7/2006 | Lamkin et al. | |
| 2006/0193300 A1* | 8/2006 | Rawat | H04W 16/18 370/338 |
| 2006/0235796 A1 | 10/2006 | Johnson et al. | |
| 2007/0030824 A1* | 2/2007 | Ribaudo | G01S 5/02 370/328 |
| 2007/0171910 A1* | 7/2007 | Kumar | H04W 76/11 370/392 |
| 2007/0189249 A1* | 8/2007 | Gurevich | H04W 12/0401 370/338 |
| 2007/0233832 A1 | 10/2007 | Narayanan et al. | |
| 2007/0298720 A1* | 12/2007 | Wolman | H04W 12/1202 455/66.1 |
| 2008/0016556 A1* | 1/2008 | Selignan | H04W 76/50 726/7 |
| 2008/0049702 A1 | 2/2008 | Meylan et al. | |
| 2008/0052395 A1* | 2/2008 | Wright | H04W 4/029 709/224 |
| 2008/0102854 A1 | 5/2008 | Yi et al. | |
| 2009/0235354 A1* | 9/2009 | Gray | H04W 24/08 726/22 |
| 2009/0274094 A1 | 11/2009 | Engwer | |
| 2009/0285190 A1 | 11/2009 | Baron et al. | |
| 2010/0050235 A1 | 2/2010 | Hardie et al. | |
| 2010/0106966 A1 | 4/2010 | Santos et al. | |
| 2010/0165875 A1* | 7/2010 | Kneckt | H04W 8/005 370/254 |
| 2010/0313241 A1 | 12/2010 | Lee et al. | |
| 2011/0047603 A1 | 2/2011 | Gordon et al. | |
| 2011/0149967 A1 | 6/2011 | Chen et al. | |
| 2011/0162070 A1 | 6/2011 | Krasser et al. | |
| 2011/0320535 A1 | 12/2011 | Donaldson | |
| 2012/0116886 A1 | 5/2012 | Manku | |
| 2012/0117250 A1 | 5/2012 | Santamaria et al. | |
| 2012/0131638 A1 | 5/2012 | Bellwood et al. | |
| 2012/0209950 A1 | 8/2012 | Zhong et al. | |
| 2012/0213211 A1* | 8/2012 | Remaker | H04L 61/2092 370/338 |
| 2012/0221692 A1 | 8/2012 | Steiner et al. | |
| 2013/0019298 A1* | 1/2013 | Jover Segura | H04L 63/101 726/7 |
| 2013/0067041 A1 | 3/2013 | Low et al. | |
| 2013/0109314 A1* | 5/2013 | Kneckt | H04W 4/80 455/41.2 |
| 2013/0128811 A1* | 5/2013 | Bradish | H04W 48/12 370/328 |
| 2013/0145451 A1 | 6/2013 | Berionne et al. | |
| 2013/0244579 A1 | 9/2013 | Hohteri et al. | |
| 2014/0003286 A1* | 1/2014 | Estevez | H04W 84/18 370/254 |
| 2014/0066063 A1 | 3/2014 | Park | |
| 2014/0169221 A1 | 6/2014 | Cha et al. | |
| 2014/0189808 A1* | 7/2014 | Mahaffey | H04L 63/0853 726/4 |
| 2014/0269657 A1* | 9/2014 | Kim | H04W 4/021 370/338 |
| 2014/0325615 A1* | 10/2014 | Scahill | H04W 12/122 726/4 |
| 2014/0355523 A1* | 12/2014 | Congdon | H04W 76/10 370/328 |
| 2015/0141005 A1* | 5/2015 | Suryavanshi | H04L 63/104 455/434 |
| 2015/0327060 A1* | 11/2015 | Gilson | H04L 67/16 726/7 |
| 2015/0334632 A1* | 11/2015 | Rudolph | H04W 12/1202 726/4 |
| 2015/0339368 A1 | 11/2015 | Gruber | |
| 2015/0365400 A1 | 12/2015 | Cox | |
| 2015/0365868 A1 | 12/2015 | Chang et al. | |
| 2016/0043867 A1 | 2/2016 | Bonsignore et al. | |

FOREIGN PATENT DOCUMENTS

| | | | | |
|---|---|---|---|---|
| CN | 102130909 A | 7/2011 | | |
| CN | 102843682 A | 12/2012 | | |
| CN | 103209449 A | 7/2013 | | |
| CN | 103546890 A | 1/2014 | | |
| CN | 103648094 A | 3/2014 | | |
| CN | 103765849 A | 4/2014 | | |
| EP | 2249593 A1 | 11/2010 | | |
| EP | 2637092 A2 | 9/2013 | | |
| EP | 2947925 A1 | 11/2015 | | |
| JP | 2003208375 | 7/2003 | | |
| JP | 2003-224569 A | 8/2003 | | |
| JP | 2006067174 | 3/2006 | | |
| JP | 2010288271 | 12/2010 | | |
| JP | 2013187568 | 9/2013 | | |
| JP | 2015231226 A | * | 12/2015 | ........... H04W 4/029 |
| KR | 10-2010-0131211 A | 12/2010 | | |
| KR | 101198329 B1 | 11/2012 | | |
| KR | 10-2013-0107774 A | 10/2013 | | |
| KR | 101371349 B1 | 3/2014 | | |
| WO | 2007/148969 A1 | 12/2007 | | |
| WO | 2011/017924 A1 | 2/2011 | | |
| WO | 2014/112595 A1 | 7/2014 | | |
| WO | 2015/074367 A1 | 5/2015 | | |

OTHER PUBLICATIONS

Examination Report for European Application No. 15829515.4, dated Jul. 25, 2018, 9 pages.
European Search Report for Application No. 15829515.4, dated Nov. 9, 2017, 13 pages.
Office Action for Japanese Application No. 2017-506918, dated Aug. 29, 2017 (English Translation).
International Search Report and Written Opinion for Application No. PCT/CN2015/084338, dated Sep. 29, 2015, 15 pages.
Office Action for Korean Application No. 10-2018-7021429, dated Feb. 13, 2019, 10 pages.

(56) References Cited

OTHER PUBLICATIONS

Official Action dated Jan. 4, 2019, issued in related European Application No. 15829515.4 (17 pages).
First Office Action dated Apr. 24, 2018, issued in related Chinese Application No. 201410389741.3 (9 pages).
Office Action dated Nov. 24, 2017, issued in related Korean Application No. 10-2017-7006405 (15 pages).
PCT International Preliminary Report on Patentability dated Feb. 23, 2017, issued in related International Application No. PCT/CN2015/084338 (16 pages).
First Examination Report for Indian Application No. 201747001659 dated Feb. 15, 2020.
Notice of Decision for Rejection for Korean Application No. 10-2018-7021429 dated Aug. 22, 2019 (5 pages).
Search Report for European Application No. 19209220.3 dated Jan. 2, 2020 (10 pages).
Decision to Grant dated Jan. 23, 2018, issued in related Japanese Application No. 2017-506918 (5 pages), with English machine translation.
First Search for Chinese Application No. 201811399704.5 dated Dec. 2, 2020.

\* cited by examiner

INFORMATION PUSHING METHOD, SERVER, SHARER CLIENT AND THIRD-PARTY CLIENT

CROSS-REFERENCE TO RELATED APPLICATIONS

This application is a continuation of U.S. application Ser. No. 15/326,908, filed on Jan. 17, 2017, and entitled "Information Pushing Method, Server, Sharer Client and Third-Party Client", which is a national phase application of International Application No. PCT/CN2015/084338, filed on Jul. 17, 2015. The International Application No. PCT/CN2015/084338 claims priority to and benefits of Chinese Patent Application No. 201410389741.3, filed on Aug. 8, 2014. The contents of the above-referenced applications are incorporated herein by reference in their entirety.

TECHNICAL FIELD

The present application relates to the field of communication technologies, and in particular, to an information pushing method, server, sharer client and third-party client.

BACKGROUND ART

In the prior art, information pushing is generally implemented by sending information to a client through polling by a server. Specifically, the server detects a connection with the client at a certain time interval, or establishes a connection with the client periodically; therefore, the server sends generated information to the client when there is an effective connection.

In the process of implementing the present application, the inventor finds that the prior art at least has the following problem:

the timing of information pushing in the prior art cannot be associated with establishment of a specific connection.

SUMMARY

An objective of embodiments of the present application is to provide an information pushing method, server, sharer client and third-party client, to associate the timing of information pushing with the establishment of a specific connection.

To solve the above technical problem, the embodiments of the present application provide an information pushing method, server, sharer client and third-party client, which are implemented as follows:

An information pushing method, including:

a wireless network sharer client obtaining a first identifier of a wireless network selected from a wireless network list scanned/stored by a wireless network sharer terminal, and sending the same to a server;

the server generating a second identifier and sending the same to the wireless network sharer client;

the wireless network sharer changing the first identifier of the wireless network into a third identifier based on the second identifier;

the wireless network sharer client obtaining a wireless network list updated by a wireless network sharer mobile terminal and sending the third identifier of the selected wireless network in the list to the server; and the server comparing the second identifier with the third identifier, allowing successful authentication when the two identifiers are consistent, and registering information about the devices of the wireless network;

where the method further includes:

the wireless network sharer configuring the wireless network sharer client/the wireless network device to send push information to a third-party terminal upon reception of a message indicating successful access of the third-party terminal to the wireless network.

An information pushing method, including:

a wireless network sharer client obtaining a first identifier of a wireless network selected from a wireless network list scanned/stored by a wireless network sharer terminal, and sending the same to a server;

the server generating a second identifier and sending the same to the wireless network sharer client;

the wireless network sharer changing the first identifier of the wireless network into a third identifier based on the second identifier;

the wireless network sharer client obtaining a wireless network list updated by a wireless network sharer mobile terminal and sending the third identifier of the selected wireless network in the list to the server; and the server comparing the second identifier with the third identifier, allowing successful authentication when the two identifiers are consistent, and registering information about the devices of the wireless network;

where the method further includes:

the wireless network sharer client sending push information to the server, and notifying the server to send the push information to a third-party terminal upon reception of a message indicating successful access of the third-party terminal to the wireless network.

An information pushing method, including:

a wireless network sharer client obtaining a first identifier of a wireless network selected from a wireless network list scanned/stored by a wireless network sharer terminal and a MAC address of a corresponding wireless network device, and sending the same to a server;

the server generating a second identifier and sending the same to the wireless network sharer client;

the wireless network sharer changing the first identifier of the wireless network into a third identifier based on the second identifier;

the wireless network sharer client obtaining a wireless network list updated by a wireless network sharer mobile terminal and sending the third identifier of the selected wireless network in the list and a MAC address of a corresponding wireless network device to the server; and the server comparing the second identifier with the third identifier, comparing the MAC address of the wireless network device corresponding to the first identifier with the MAC address of the wireless network device corresponding to the third identifier, and allowing successful authentication when the comparison results are consistent;

where the method further includes:

the wireless network sharer configuring the wireless network sharer client/the wireless network device to send push information to a third-party terminal upon reception of a message indicating successful access of the third-party terminal to the wireless network.

An information pushing method, including:

a wireless network sharer client obtaining a first identifier of a wireless network selected from a wireless network list scanned/stored by a wireless network sharer terminal and a MAC address of a corresponding wireless network device, and sending the same to a server;

the server generating a second identifier and sending the same to the wireless network sharer client;

the wireless network sharer changing the first identifier of the wireless network into a third identifier based on the second identifier;

the wireless network sharer client obtaining a wireless network list updated by a wireless network sharer mobile terminal and sending the third identifier of the selected wireless network in the list and a MAC address of a corresponding wireless network device to the server; and the server comparing the second identifier with the third identifier, comparing the MAC address of the wireless network device corresponding to the first identifier with the MAC address of the wireless network device corresponding to the third identifier, and allowing successful authentication when the comparison results are consistent;

where the method further includes:

the wireless network sharer client sending push information to the server, and notifying the server to send the push information to a third-party terminal upon reception of a message indicating successful access of the third-party terminal to the wireless network.

An information pushing method, including:

a server receiving a first identifier of a selected wireless network sent by a wireless network sharer client;

the server generating a second identifier and sending the same to the wireless network sharer client;

the server receiving a third identifier of the selected wireless network sent by the wireless network sharer client; and the server comparing the second identifier with the third identifier, allowing successful authentication when the two identifiers are consistent, and registering information about the devices of the wireless network.

An information pushing method, including:

a server receiving a first identifier of a selected wireless network sent by a wireless network sharer client and a MAC address of a corresponding wireless network device;

the server generating a second identifier and sending the same to the wireless network sharer client;

the server receiving a third identifier of the selected wireless network sent by the wireless network sharer client and a MAC address of a corresponding wireless network device; and the server comparing the second identifier with the third identifier, comparing the MAC address of the wireless network device corresponding to the first identifier with the MAC address of the wireless network device corresponding to the third identifier, and allowing successful authentication when the comparison results are consistent.

An information pushing method, including:

a wireless network sharer client obtaining a first identifier of a wireless network selected from a wireless network list scanned/stored by a wireless network sharer terminal, and sending the same to a server;

the wireless network sharer client receiving a second identifier sent by the server; and the wireless network sharer client obtaining a wireless network list updated by a wireless network sharer mobile terminal and sending a third identifier of the selected wireless network in the list to the server.

An information pushing method, including:

a wireless network sharer client obtaining a first identifier of a wireless network selected from a wireless network list scanned/stored by a wireless network sharer terminal and a MAC address of a corresponding wireless network device, and sending the same to a server;

the wireless network sharer client receiving a second identifier sent by the server and a MAC address of a corresponding wireless network device; and the wireless network sharer client obtaining a wireless network list updated by a wireless network sharer mobile terminal and sending a third identifier of the selected wireless network in the list and a MAC address of a corresponding wireless network device to the server.

An information pushing method, including:

a third-party terminal entering a wireless shared network area, and a third-party client obtaining a device MAC address broadcast by the wireless shared network;

the third-party client comparing the obtained MAC address with a MAC address in a stored MAC address list, and when the obtained MAC address is in the stored MAC address list, the third-party client obtaining a corresponding wireless network identifier from a correspondence between a stored MAC address and a wireless network identifier;

the third-party client initiating a connection request to a wireless network corresponding to the MAC address by using the obtained wireless network identifier; and after the third-party client is successfully connected to the wireless network corresponding to the MAC address by using the obtained wireless network identifier, further including: receiving push information sent by the connected wireless network device/wireless network sharer client/server.

An information pushing method, including:

a third-party terminal entering a wireless shared network area, and a third-party client obtaining a device MAC address broadcast by the wireless shared network;

the third-party client comparing the obtained MAC address with a MAC address in a stored MAC address list, and when the obtained MAC address is in the stored MAC address list, the third-party client obtaining a corresponding wireless network identifier and connection key from a correspondence between a stored MAC address and a wireless network identifier as well as a connection key;

the third-party client initiating a connection request to a wireless network corresponding to the MAC address by using the obtained wireless network identifier and connection key; and after the third-party client is successfully connected to the wireless network corresponding to the MAC address by using the obtained wireless network identifier, further including: receiving push information sent by the connected wireless network device/wireless network sharer client/server.

An information pushing method, including:

a third-party terminal entering a wireless shared network area, and a third-party client obtaining a first set of device MAC addresses broadcast by the wireless shared network;

the third-party client comparing the obtained first set of MAC addresses with a second set of MAC addresses in a stored MAC address list in the same wireless network shared area, and when the number of MAC addresses in an intersection reaches or exceeds a predetermined number, the third-party client obtaining wireless network identifiers corresponding to the MAC addresses in the intersection from a correspondence between a stored MAC address and a wireless network identifier;

the third-party client initiating a connection request to a wireless network corresponding to the MAC address by using at least one of the obtained wireless network identifiers; and after the third-party client is successfully connected to the wireless network corresponding to the MAC address by using the wireless network identifier according to which the connection request is initiated, further including: the third-party client receiving push information sent by the connected wireless network device/wireless network sharer client/server.

An information pushing method, including:

a third-party terminal entering a wireless shared network area, and a third-party client obtaining a first set of device MAC addresses broadcast by the wireless shared network;

the third-party client comparing the obtained first set of MAC addresses with a second set of MAC addresses in a stored MAC address list, and when the number of MAC addresses in an intersection reaches or exceeds a predetermined number, the third-party client obtaining wireless network identifiers and connection keys corresponding to the MAC addresses in the intersection from a correspondence between a stored MAC address and a wireless network identifier as well as a connection key;

the third-party client initiating a connection request to a wireless network corresponding to the MAC address by using at least one pair of the obtained wireless network identifiers and corresponding connection keys; and after the third-party client is successfully connected to the wireless network corresponding to the MAC address by using the wireless network identifier and the corresponding connection key according to which the connection request is initiated, further including: the third-party client receiving push information sent by the connected wireless network device/wireless network sharer client/server.

A server, including:

a first receiving unit, configured to receive a first identifier of a selected wireless network sent by a wireless network sharer client;

a second receiving unit, configured to receive a third identifier of the selected wireless network sent by the wireless network sharer client; and a comparison unit, configured to compare the second identifier with the third identifier, allow successful authentication when the two identifiers are consistent, and register information about the devices of the wireless network.

A server, including:

a first receiving unit, configured to receive a first identifier of a selected wireless network sent by a wireless network sharer client and a MAC address of a corresponding wireless network device;

a generation unit, configured to generate a second identifier and send the same to the wireless network sharer client;

a second receiving unit, configured to receive a third identifier of the selected wireless network sent by the wireless network sharer client and a MAC address of a corresponding wireless network device; and a comparison unit, configured to compare the second identifier with the third identifier, compare the MAC address of the wireless network device corresponding to the first identifier with the MAC address of the wireless network device corresponding to the third identifier, and allow successful authentication when the comparison results are consistent.

A wireless network sharer client, including:

a first obtaining unit, configured to obtain a first identifier of a wireless network selected from a wireless network list scanned/stored by a wireless network sharer terminal, and send the same to a server;

a fifth receiving unit, configured for the wireless network sharer client to receive a second identifier sent by the server; and a second obtaining unit, configured to obtain a wireless network list updated by a wireless network sharer mobile terminal and send a third identifier of the selected wireless network in the list to the server.

A wireless network sharer client, including:

a first obtaining unit, configured to obtain a first identifier of a wireless network selected from a wireless network list scanned/stored by a wireless network sharer terminal and a MAC address of a corresponding wireless network device, and send the same to a server;

a fifth receiving unit, configured for the wireless network sharer client to receive a second identifier sent by the server and a MAC address of a corresponding wireless network device; and a second obtaining unit, configured to obtain a wireless network list updated by a wireless network sharer mobile terminal and send a third identifier of the selected wireless network in the list and a MAC address of a corresponding wireless network device to the server.

A third-party client, including:

a third obtaining unit, configured to, when a third-party terminal enters a wireless shared network area, obtain a device MAC address broadcast by the wireless shared network;

a fourth obtaining unit, configured to compare the obtained MAC address with a MAC address in a stored MAC address list, and when the obtained MAC address is in the stored MAC address list, obtain a corresponding wireless network identifier from a correspondence between a stored MAC address and a wireless network identifier;

a requesting unit, configured to initiate a connection request to a wireless network corresponding to the MAC address by using the obtained wireless network identifier; and a seventh receiving unit, configured to receive push information sent by the connected wireless network device/ wireless network sharer client/server.

A third-party client, including:

a third obtaining unit, configured to, when a third-party terminal enters a wireless shared network area, obtain a device MAC address broadcast by the wireless shared network;

a fourth obtaining unit, configured to compare the obtained MAC address with a MAC address in a stored MAC address list, and when the obtained MAC address is in the stored MAC address list, the third-party client obtaining a corresponding wireless network identifier and connection key from a correspondence between a stored MAC address and a wireless network identifier as well as a connection key;

a requesting unit, configured to initiate a connection request to a wireless network corresponding to the MAC address by using the obtained wireless network identifier and connection key; and a seventh receiving unit, configured to receive push information sent by the connected wireless network device/ wireless network sharer client/server.

A third-party client, including:

a third obtaining unit, configured to, when a third-party terminal enters a wireless shared network area, obtain a first set of device MAC addresses broadcast by the wireless shared network;

a fourth obtaining unit, configured to compare the obtained first set of MAC addresses with a second set of MAC addresses in a stored MAC address list in the same wireless network shared area, and when the number of MAC addresses in an intersection reaches or exceeds a predetermined number, the third-party client obtaining wireless network identifiers corresponding to the MAC addresses in the intersection from a correspondence between a stored MAC address and a wireless network identifier;

a requesting unit, configured to initiate a connection request to a wireless network corresponding to the MAC address by using at least one of the obtained wireless network identifiers; and a seventh receiving unit, configured to receive push information sent by the connected wireless network device/wireless network sharer client/server.

A third-party client, including:

a third obtaining unit, configured to, when a third-party terminal enters a wireless shared network area, obtain a first set of device MAC addresses broadcast by the wireless shared network;

a fourth obtaining unit, configured to compare the obtained first set of MAC addresses with a second set of MAC addresses in a stored MAC address list, and when the number of MAC addresses in an intersection reaches or exceeds a predetermined number, the third-party client obtaining wireless network identifiers and connection keys corresponding to the MAC addresses in the intersection from a correspondence between a stored MAC address and a wireless network identifier as well as a connection key;

a requesting unit, configured to initiate a connection request to a wireless network corresponding to the MAC address by using at least one pair of the obtained wireless network identifiers and corresponding connection keys; and a seventh receiving unit, configured to receive push information sent by the connected wireless network device/wireless network sharer client/server.

It can be seen from the technical solution provided in the embodiments of the present application that the embodiments of the present application may make the timing of information pushing be associated with the establishment of a specific connection.

BRIEF DESCRIPTION OF THE DRAWINGS

To describe the technical solutions in the embodiments of the present application or the prior art more clearly, the accompanying drawings to be used in the descriptions about the embodiments or the prior art are briefly introduced in the following. Apparently, the accompanying drawings in the following descriptions are merely some embodiments described in the present application, and persons of ordinary skill in the art can also derive other drawings from these accompanying drawings without creative efforts.

DETAILED DESCRIPTION

Embodiments of the present application provide an information pushing method, server, sharer client and third-party client.

In order that persons skilled in the art can better understand the technical solutions in the present application, the technical solutions in the embodiments of the present application will be described clearly and completely with reference to the accompanying drawings in the embodiments of the present application. Apparently, the described embodiments are merely some of rather than all of the embodiments of the present application. Based on the embodiments of the present application, all other embodiments derived by persons of ordinary skill in the art without any creative efforts shall all fall within the protection scope of the present application.

Connections involved in the present application may include communication connections in a short-distance wireless communication manner, for example, communication technologies such as Bluetooth, Infrared (IrDA), a wireless local area network (WI-FI or WLAN, mostly using 802.11 series protocols), WIFI direct connection (Wi-Fi Direct), Ultra Wide Band communication, Zigbee, and Near Field Communication (NFC). Specific implementation solutions are introduced with reference to the above communication manners in the present application, and other communication manners may also be applied to the following specific solutions of the present application.

Illustration is given in such a wireless communication manner as WIFI, and particularly, illustration is given by using WIFI sharing as an example. In a scenario, a creator who creates a WIFI network or an owner who owns a WIFI network may share the WIFI network to other terminals in a paid or unpaid manner. The WIFI network may be implemented by a WIFI device, for example, a router having a WIFI function. In the present application, a body sharing the WIFI network, such as the WIFI network creator, the WIFI network owner or in similar cases is generally referred to as a WIFI sharer.

Figure 1:
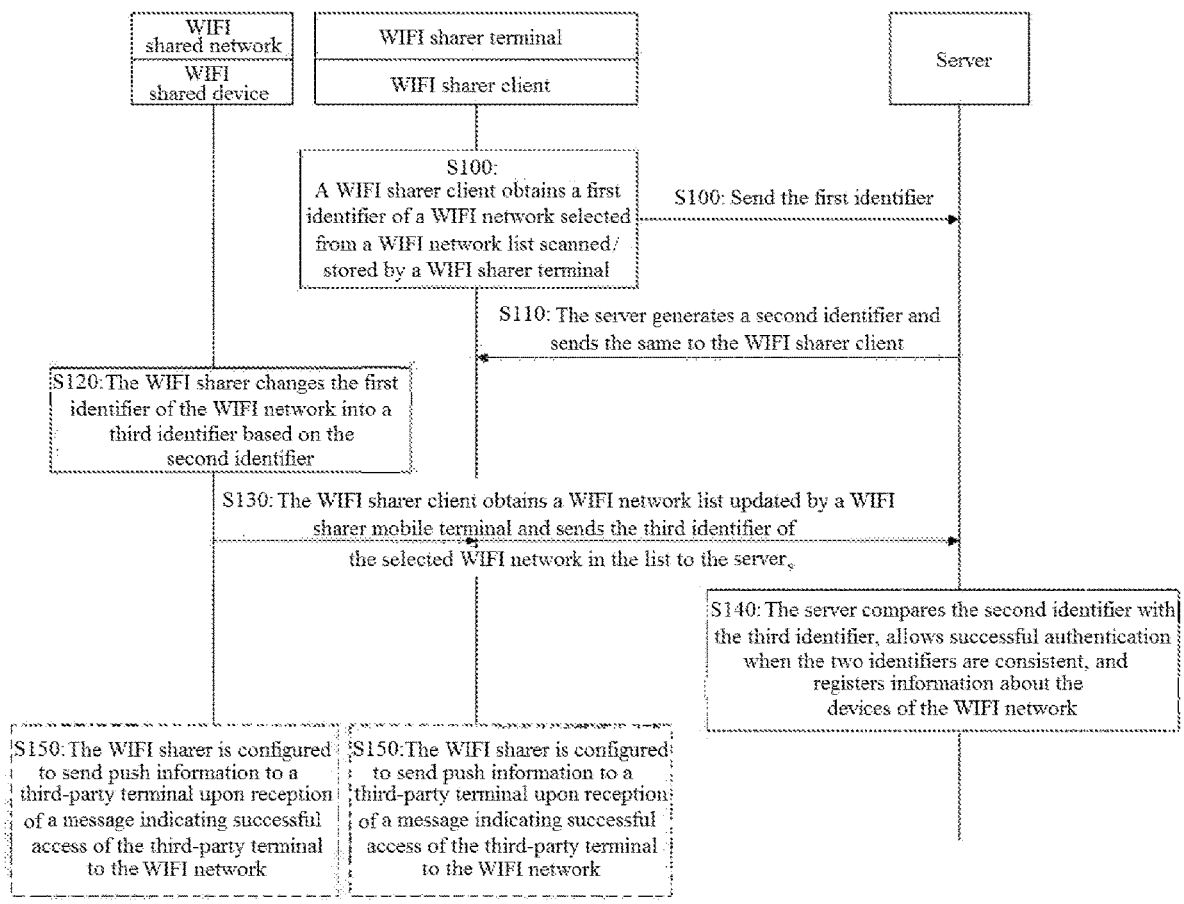
FIG. 1 is a flow chart of an embodiment of an information pushing method according to the present application.

The present application also relates to a network platform, and the network platform may manage a WIFI sharer and a WIFI user by a server. Information pushing implemented in the present application may be a page, a link, a short message, a multimedia file, and the like preset by the WIFI sharer. By the process as shown in FIG. 1, the WIFI sharer may join the network platform and configure to-be-pushed information to be sending push information to a third-party terminal upon reception of a message indicating successful access of the third-party terminal to the WIFI network.

S100: A WIFI sharer client obtains a first identifier of a WIFI network selected from a WIFI network list scanned/stored by a WIFI sharer terminal, and sends the same to a server.

The WIFI sharer may possess the terminal, and the terminal may be a terminal device such as a mobile terminal or a desktop computer. An application may be installed in the terminal, to facilitate communication of the WIFI sharer and the server of the network platform. The application may be, for example, an application installed on an operating system of the terminal, or a web page. A subsequent client may mainly refer to a terminal in which an application is installed or a terminal capable of opening a web page to implement the same function.

The WIFI sharer client may obtain a WIFI network list scanned/stored by the terminal where the WIFI sharer client is installed.

The WIFI sharer may select, on the client interface, a specific WIFI network in the WIFI network list, for example, by an operation such as mouse click, mouse wheel scrolling, or touch selection. The WIFI sharer client may obtain a first identifier of the selected WIFI network, the identifier is generally, for example, a Service Set Identifier (SSID) of the WIFI network. Then, the WIFI sharer client may send the selected first identifier to the server.

The selected WIFI network is generally a WIFI network created or owned by the WIFI sharer, for example, the WIFI sharer has a wireless router with a certain coverage, and provides access sharing of the wireless router.

It should be noted that, before performing the S100, the WIFI sharer may log in to the client by using a user account and a password. The user account may be registered in advance, which is not elaborated herein.

The WIFI sharer client sending the first identifier to the server may be sending via a WIFI network connected by the WIFI sharer mobile terminal, and may also be sending via a communication network such as 2G, 3G, and 4G, which is not limited herein.

S110: The server generates a second identifier and sends the same to the WIFI sharer client.

Upon reception of the first identifier of the selected WIFI network sent by the WIFI sharer client, the server may be triggered to generate a second identifier. The process may be obtaining a character sequence based on the first identifier by using a certain hash algorithm, and may also be generating a random character sequence according to a predetermined rule. The character sequence may be used as the second identifier, and the identifier meets the requirements of a common SSID, for example, it is required that the maximum length does not exceed 32 characters, and it must be letters, numerals or a combination thereof, and some devices can also receive Chinese characters.

Then, the server may send the generated second identifier to the WIFI sharer client.

S120: The WIFI sharer changes the first identifier of the WIFI network into a third identifier based on the second identifier.

The WIFI sharer may change the first identifier of the WIFI network into a third identifier manually, for example, by logging in to a WIFI device through a terminal. The modification may be modifying the SSID on a WIFI device configuration page by logging in to the WIFI device through the terminal. It may be modification based on the second identifier generated by the server and sent to the WIFI sharer client. Ideally, the modified third identifier is the second identifier generated by the server and sent to the WIFI sharer client.

S130: The WIFI sharer client obtains a WIFI network list updated by a WIFI sharer mobile terminal and sends the third identifier of the selected WIFI network to the server.

The WIFI sharer mobile terminal can update a list of WIFI networks detected by it. The updated WIFI network list may include a WIFI network of the third identifier.

The WIFI sharer may select, on the client interface, the WIFI network corresponding to the third identifier in the WIFI network list. Then, the WIFI sharer client may receive the specific WIFI network selected from the WIFI network list by the WIFI sharer on the client interface.

Further, the WIFI sharer client may send the selected third identifier of the selected WIFI network to the server.

S140: The server compares the second identifier with the third identifier, allows successful authentication when the two identifiers are consistent, and registers information about the devices of the WIFI network.

Upon reception of the third identifier of the WIFI network sent by the WIFI sharer client, the server may compare the third identifier with the second identifier generated by the server. When the comparison result is that the two identifiers are consistent, it may be determined that the WIFI sharer has the right of control or ownership on the WIFI network corresponding to the third identifier (or the second identifier), and therefore, the WIFI sharer is allowed to share the WIFI network to the network platform. In contrast, if the third identifier is different from the second identifier after comparison, generally, the WIFI sharer does not have the right of control or ownership on the WIFI network corresponding to the third identifier, and therefore, authentication of sharing the network is not allowed.

Information of the WIFI network device may be a Media Access Control (MAC) address of the WIFI network device. The MAC address is unique, and can be used for distinguishing from other WIFI devices.

The server registering the information of the WIFI network device may be the WIFI sharer client sending the information of the WIFI network device to the server, and may also be the server directly obtaining the information from the WIFI network device, or the WIFI network device directly sending the information to the server.

The method further includes:

S150: The WIFI sharer client is configured to send push information to a third-party terminal upon reception of a message indicating successful access of the third-party terminal to the WIFI network.

An object of the configuration may be the WIFI sharer client, and may also be the WIFI network device. In other words, the WIFI network sharer configures that the WIFI network sharer client/the WIFI network device sends push information to a third-party terminal upon reception of a message indicating successful access of the third-party terminal to the WIFI network.

It should be noted that, the sequence of performing the S150 and the S100 to S140 does not need to be specifically limited.

By using the above method, it may be configured that the timing of information pushing is associated with the establishment of a specific connection.

Figure 2:
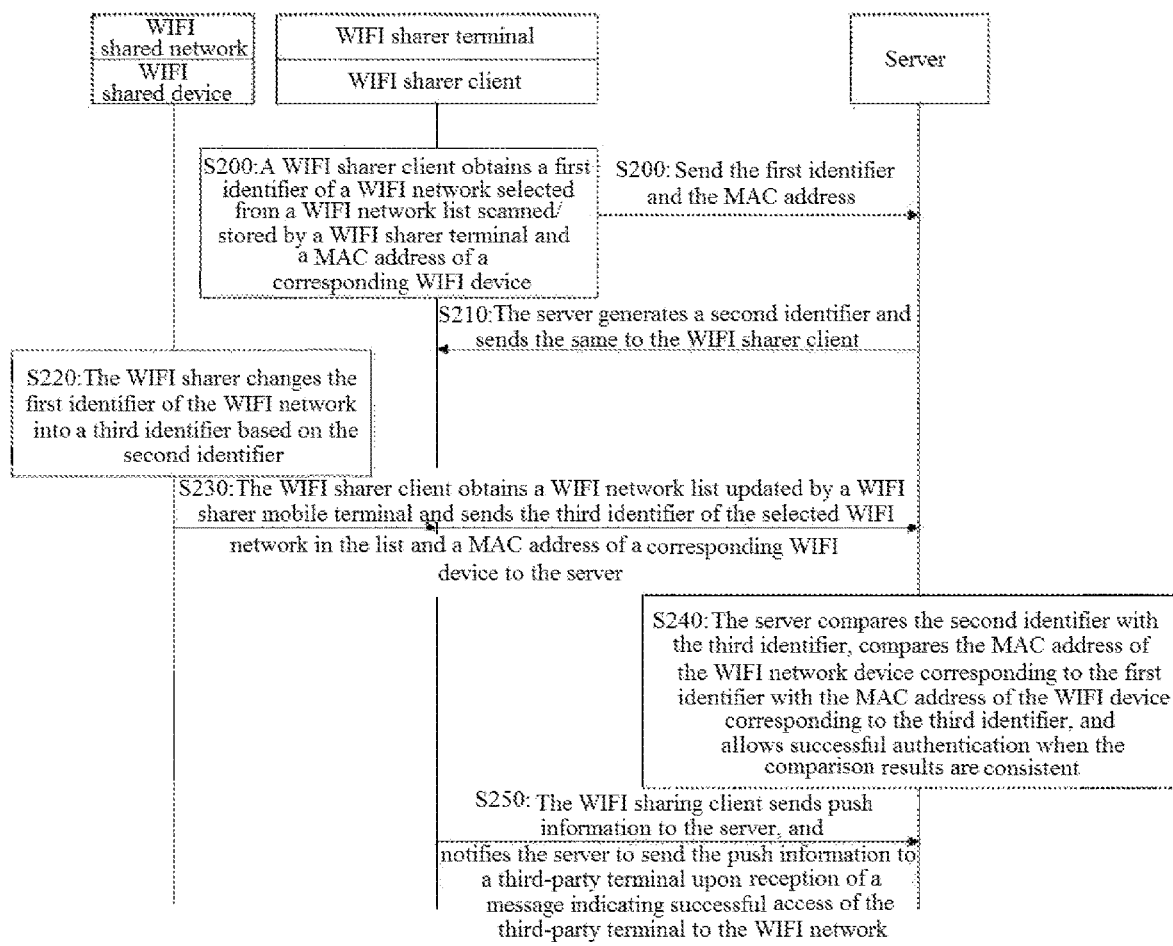
FIG. 2 is a flow chart of an embodiment of an information pushing method according to the present application.

By the process as shown in FIG. 2, the WIFI sharer may also add the network platform and configure to-be-pushed information to be sending push information to a third-party terminal upon reception of a message indicating successful access of the third-party terminal to the WIFI network.

S200: A WIFI sharer client obtains a first identifier of a WIFI network selected from a WIFI network list scanned/stored by a WIFI sharer terminal and a MAC address of a corresponding WIFI device, and sends the same to a server.

Different from S100, in S200, in addition to sending the first identifier of the selected WIFI network, the MAC address of the corresponding WIFI device is further sent. In this way, the server may acquire the first identifier of the selected WIFI network and the MAC address of the corresponding WIFI device.

S210: The server generates a second identifier and sends the same to the WIFI sharer client.

Similarly, upon reception of the first identifier of the selected WIFI network sent by the WIFI sharer client, the server may be triggered to generate a second identifier. The process may be obtaining a character sequence based on the first identifier by using a certain hash algorithm, and may also be a random character sequence generated according to a predetermined rule. The character sequence may be used as the second identifier, and the identifier meets the requirements of a common SSID, for example, it is required that the maximum length does not exceed 32 characters, and it must be letters, numerals or a combination thereof, some devices can also receive Chinese characters.

S220: The WIFI sharer changes the first identifier of the WIFI network into a third identifier based on the second identifier.

As described above, the WIFI sharer may change the first identifier of the WIFI network into a third identifier manually, for example, by logging in to a WIFI device through a terminal. The modification may be modifying the SSID on a WIFI device configuration page by logging in to the WIFI device through the terminal. It may be modification based on the second identifier generated by the server and sent to the WIFI sharer client. Ideally, the modified third identifier is the second identifier generated by the server and sent to the WIFI sharer client.

S230: The WIFI sharer client obtains a WIFI network list updated by a WIFI network sharer mobile terminal and sends the third identifier of the selected WIFI network and a MAC address of a corresponding WIFI device to the server.

Different from S130, in S230, in addition to sending the third identifier of the selected WIFI network to the server, the WIFI sharer client may further send the MAC address of the WIFI device corresponding to the selected WIFI network to the server. In this way, the server may acquire the third identifier of the selected WIFI network and the MAC address of the corresponding WIFI device.

S240: The server compares the second identifier with the third identifier, compares the MAC address of the WIFI network device corresponding to the first identifier with the MAC address of the WIFI device corresponding to the third identifier, and allows successful authentication when the comparison results are consistent.

In S240, by comparing the MAC address of the WIFI network device corresponding to the first identifier with the MAC address of the WIFI device corresponding to the third identifier, it may be determined that the first identifier and the third identifier sent by the WIFI sharer client are identifiers of the same WIFI device, which excludes the possibility that they are identifiers of different WIFI devices, that is, it is limited that the first identifier and the third identifier for comparison are the identifiers of the same WIFI device. In this way, by comparing the second identifier with the third identifier, it may be determined that the same WIFI device is modified when being triggered by the server, and the WIFI sharer notified by the server has the ownership/right of control on the WIFI network.

The method may further include:

S250: The WIFI network sharing client sends push information to the server, and notifies the server to send the push information to a third-party terminal upon reception of a message indicating successful access of the third-party terminal to the WIFI network.

By using the above method, it may be configured that the timing of information pushing is associated with the establishment of a specific connection.

Figure 3:
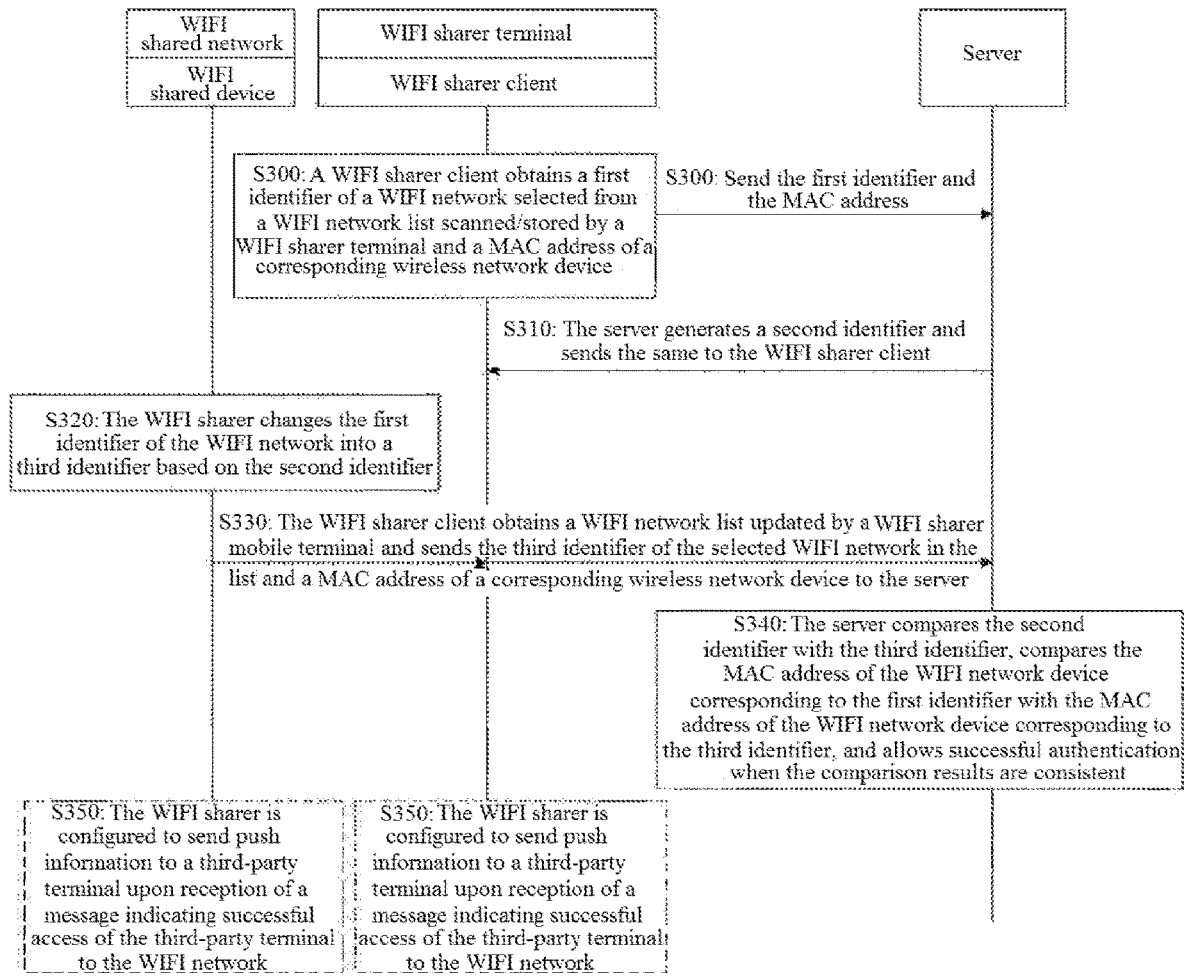
FIG. 3 is a flow chart of an embodiment of an information pushing method according to the present application.

By the process as shown in FIG. 3, the WIFI sharer may also add the network platform and configure to-be-pushed information to be sending push information to a third-party terminal upon reception of a message indicating successful access of the third-party terminal to the WIFI network.

S300: A WIFI sharer client obtains a first identifier of a WIFI network selected from a WIFI network list scanned/stored by a WIFI network sharer terminal and a MAC address of a corresponding WIFI network device, and sends the same to a server.

S310: The server generates a second identifier and sends the same to the WIFI network sharer client.

S320: The WIFI network sharer changes the first identifier of the WIFI network into a third identifier based on the second identifier.

S330: The WIFI network sharer client obtains a WIFI network list updated by a WIFI network sharer mobile terminal and sends the third identifier of the selected WIFI network and a MAC address of a corresponding WIFI device to the server.

S340: The server compares the second identifier with the third identifier, compares the MAC address of the WIFI network device corresponding to the first identifier with the MAC address of the WIFI network device corresponding to the third identifier, and allows successful authentication when the comparison results are consistent.

The method further includes:

S350: The WIFI network sharer configures that the WIFI network sharer client/the WIFI network device sends push information to a third-party terminal upon reception of a message indicating successful access of the third-party terminal to the WIFI network.

By using the above method, it may be configured that the timing of information pushing is associated with the establishment of a specific connection.

Figure 4:
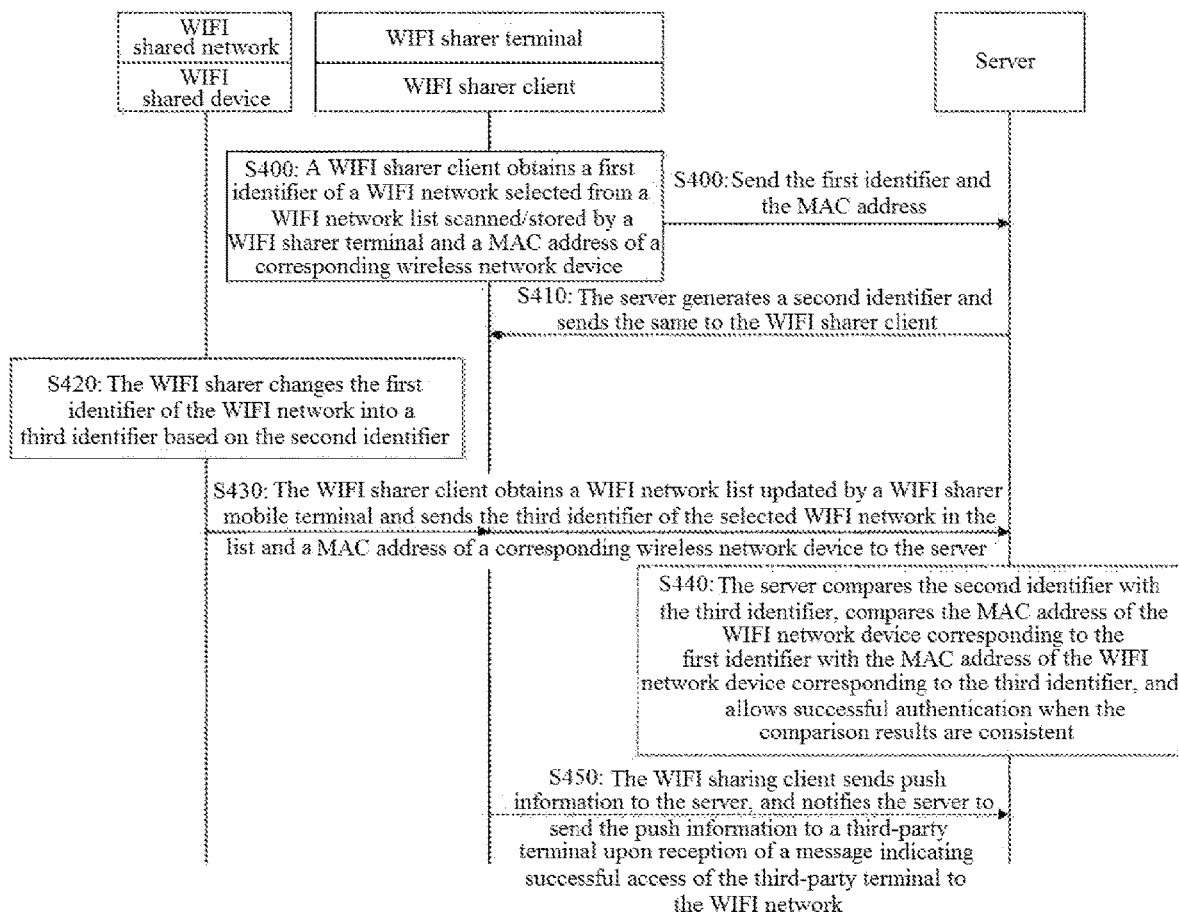
FIG. 4 is a flow chart of an embodiment of an information pushing method according to the present application.

By the process as shown in FIG. 4, the WIFI sharer may also add the network platform and configure to-be-pushed information to be sending push information to a third-party terminal upon reception of a message indicating successful access of the third-party terminal to the WIFI network.

S400: A WIFI sharer client obtains a first identifier of a WIFI network selected from a WIFI network list scanned/stored by a WIFI network sharer terminal, and sends the same to a server.

S410: The server generates a second identifier and sends the same to the WIFI network sharer client.

S420: The WIFI network sharer changes the first identifier of the WIFI network into a third identifier based on the second identifier.

S430: The WIFI network sharer client obtains a WIFI network list updated by a WIFI network sharer mobile terminal and sends the third identifier of the selected WIFI network to the server.

S440: The server compares the second identifier with the third identifier, allows successful authentication when the two identifiers are consistent, and registers information about the devices of the WIFI network.

The method further includes:

S450: The WIFI network sharing client sends push information to the server, and notifies the server to send the push information to a third-party terminal upon reception of a message indicating successful access of the third-party terminal to the WIFI network.

By using the above method, it may be configured that the timing of information pushing is associated with the establishment of a specific connection.

Figure 5:
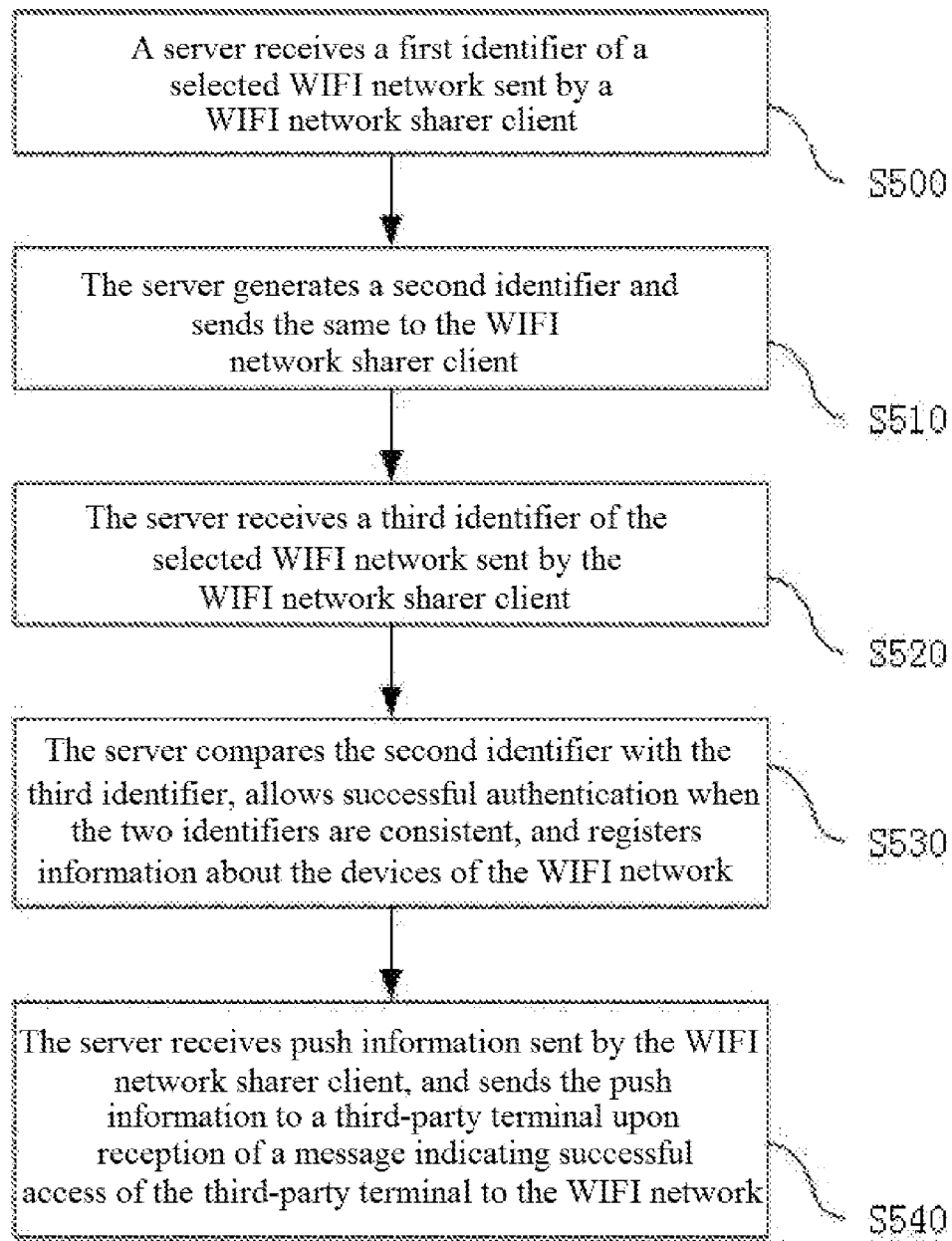
FIG. 5 is a flow chart of an embodiment of an information pushing method according to the present application.

Step procedures using the server as a body in the embodiments described in FIG. 1 and FIG. 4 of the present application are introduced hereinafter, as shown in FIG. 5, including:

S500: A server receives a first identifier of a selected WIFI network sent by a WIFI network sharer client.

S510: The server generates a second identifier and sends the same to the WIFI network sharer client.

S520: The server receives a third identifier of the selected WIFI network sent by the WIFI network sharer client.

S530: The server compares the second identifier with the third identifier, allows successful authentication when the two identifiers are consistent, and registers information about the devices of the WIFI network.

In addition, the method in FIG. 5 may further include:

S540: The server receives push information sent by the WIFI network sharer client, and sends the push information to a third-party terminal upon reception of a message indicating successful access of the third-party terminal to the WIFI network.

Figure 6:
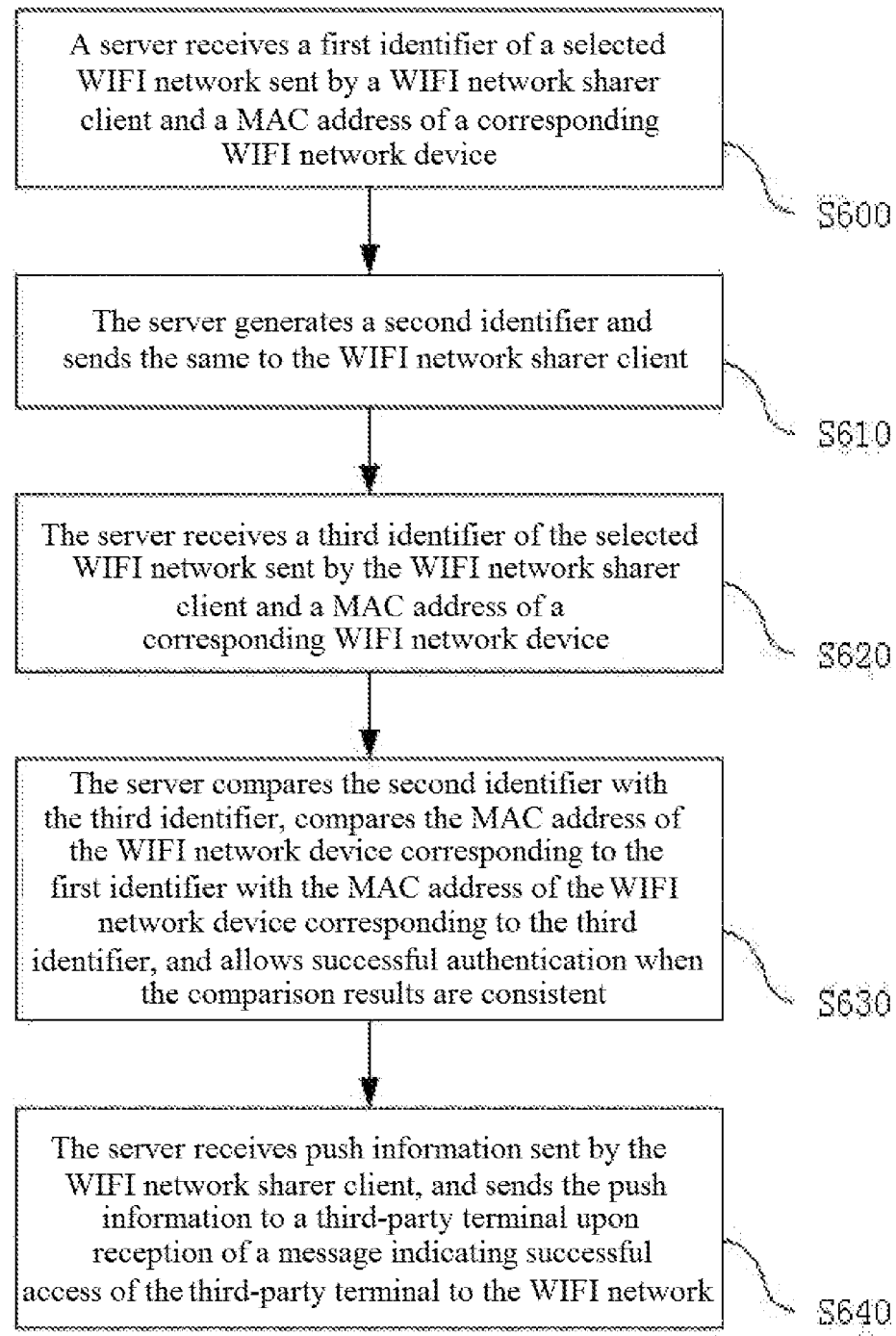
FIG. 6 is a flow chart of an embodiment of an information pushing method according to the present application.

Step procedures using the server as a body in the embodiments described in FIG. 2 and FIG. 3 of the present application are introduced hereinafter, as shown in FIG. 6, including:

S600: A server receives a first identifier of a selected WIFI network sent by a WIFI network sharer client and a MAC address of a corresponding WIFI network device.

S610: The server generates a second identifier and sends the same to the WIFI network sharer client.

S620: The server receives a third identifier of the selected WIFI network sent by the WIFI network sharer client and a MAC address of a corresponding WIFI network device.

S630: The server compares the second identifier with the third identifier, compares the MAC address of the WIFI network device corresponding to the first identifier with the MAC address of the WIFI network device corresponding to the third identifier, and allows successful authentication when the comparison results are consistent.

In addition, the method in FIG. 6 may further include:

S640: The server receives push information sent by the WIFI network sharer client, and sends the push information to a third-party terminal upon reception of a message indicating successful access of the third-party terminal to the WIFI network.

Figure 7:
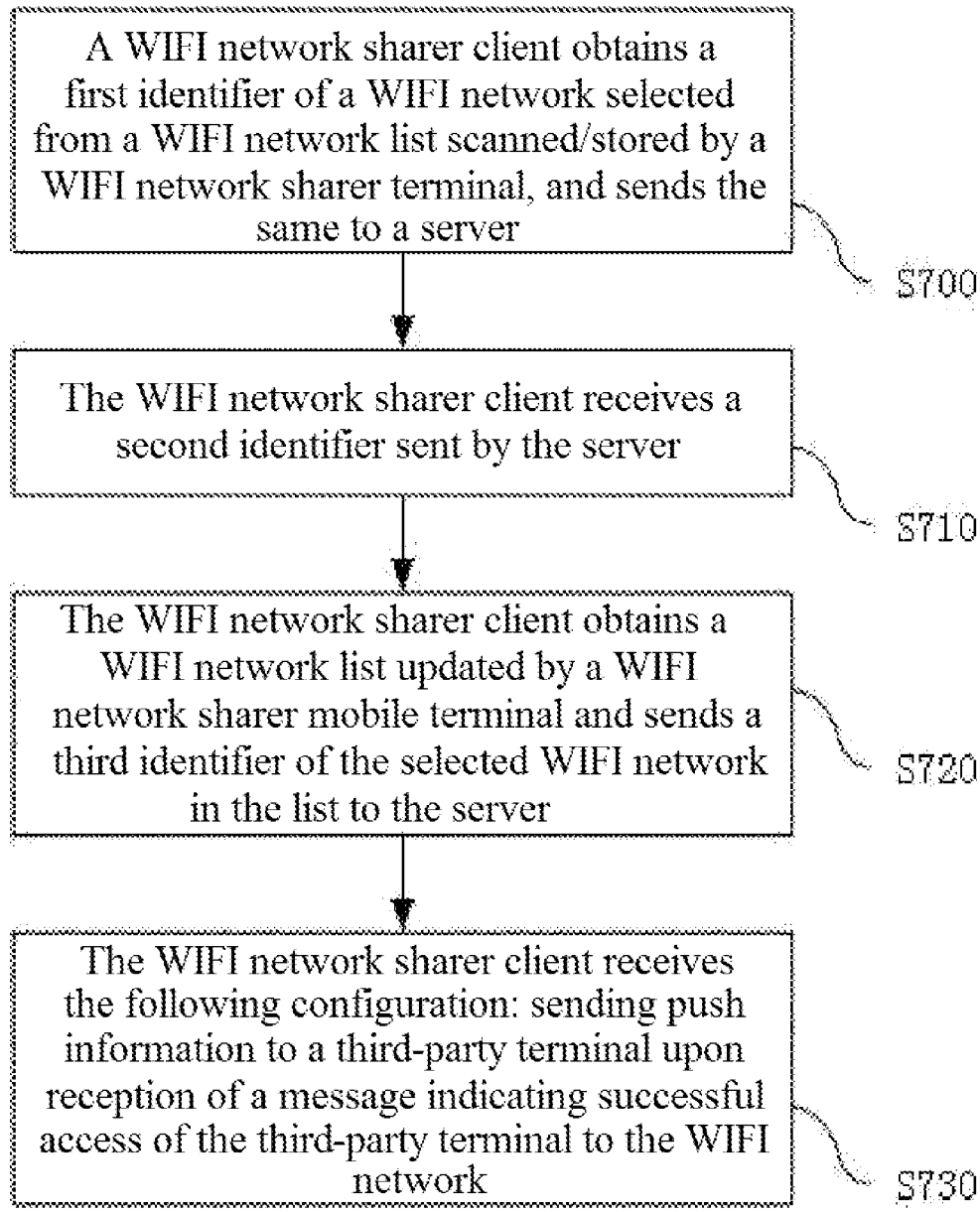
FIG. 7 is a flow chart of an embodiment of an information pushing method according to the present application.

Step procedures using the WIFI network sharer client as a body in the embodiment described in FIG. 1 of the present application are introduced hereinafter, as shown in FIG. 7, including:

S700: A WIFI network sharer client obtains a first identifier of a WIFI network selected from a WIFI network list scanned/stored by a WIFI network sharer terminal, and sends the same to a server.

S710: The WIFI network sharer client receives a second identifier sent by the server.

S720: The WIFI network sharer client obtains a WIFI network list updated by a WIFI network sharer mobile terminal and sends a third identifier of the selected WIFI network to the server.

The method may further include:

S730: The WIFI network sharer client receives the following configuration: sending push information to a third-party terminal upon reception of a message indicating successful access of the third-party terminal to the WIFI network.

Figure 8:
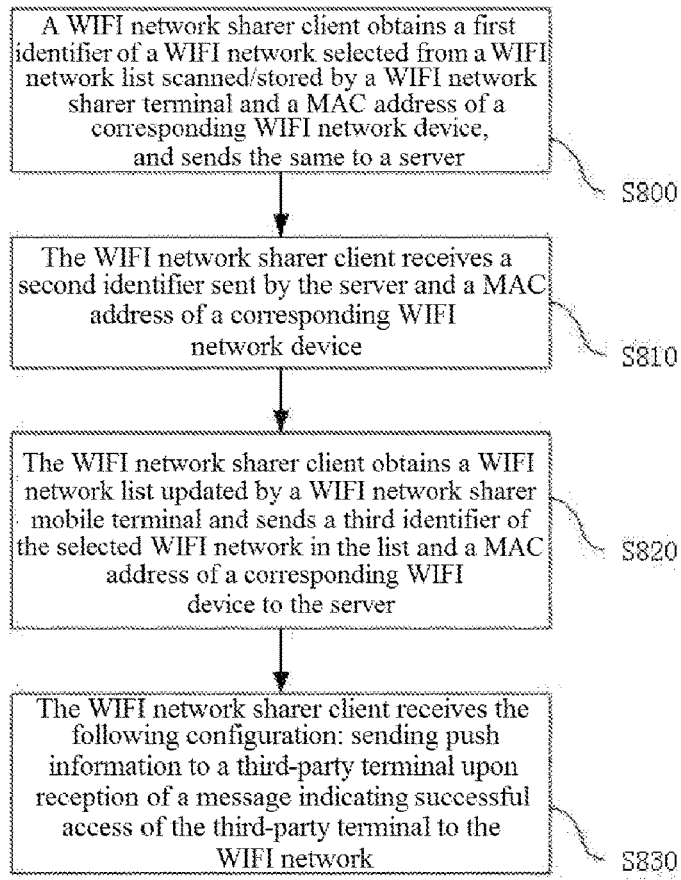
FIG. 8 is a flow chart of an embodiment of an information pushing method according to the present application.

Step procedures using the WIFI network sharer client as a body in the embodiment described in FIG. 2 of the present application are introduced hereinafter, as shown in FIG. 8, including:

S800: A WIFI network sharer client obtains a first identifier of a WIFI network selected from a WIFI network list scanned/stored by a WIFI network sharer terminal and a MAC address of a corresponding WIFI network device, and sends the same to a server.

S810: The WIFI network sharer client receives a second identifier sent by the server and a MAC address of a corresponding WIFI network device.

S820: The WIFI network sharer client obtains a WIFI network list updated by a WIFI network sharer mobile terminal and sends a third identifier of the selected WIFI network and a MAC address of a corresponding WIFI device to the server.

The method may further include:

S830: The WIFI network sharer client receives the following configuration: sending push information to a third-party terminal upon reception of a message indicating successful access of the third-party terminal to the WIFI network.

In the embodiments of FIG. 1 to FIG. 8, the process of the server generating the second identifier may include:

Manner 1: the server obtaining a character sequence by using a hash algorithm based on the received first identifier to serve as the second identifier;

or,

Manner 2: the server generating a random character sequence according to a preset rule to serve as the second identifier.

In the methods of FIG. 1 to FIG. 8, a connection key may be configured to enhance the security and performance of the WIFI sharing network. The WIFI network sharer client sends a connection key of the selected WIFI network to the server. Upon reception of the connection key of the selected WIFI network sent by the WIFI network sharer client, the server may store the connection key.

In the methods of FIG. 1 to FIG. 8, a connection key may be configured to enhance the security and performance of the WIFI sharing network; moreover, the server may verify correctness of the key. For example, the WIFI network sharer may choose to connect a selected WIFI sharing network, and may input a connection key as prompted. In this way, the WIFI network sharer client obtains the connection key for connecting the selected WIFI network. After the WIFI network sharer mobile terminal is connected to the selected WIFI network successfully by using the connection key, the WIFI network sharer client may send the obtained connection key to the server, and then the server may save the connection key.

The server may send the connection key of the WIFI network to a third-party terminal after the third-party terminal enters a coverage area of the WIFI network, or the server may send the connection key to a third-party terminal upon reception of a request from the third-party terminal. In this way, the third-party terminal may access the WIFI network by using the connection key subsequently.

Figure 9:
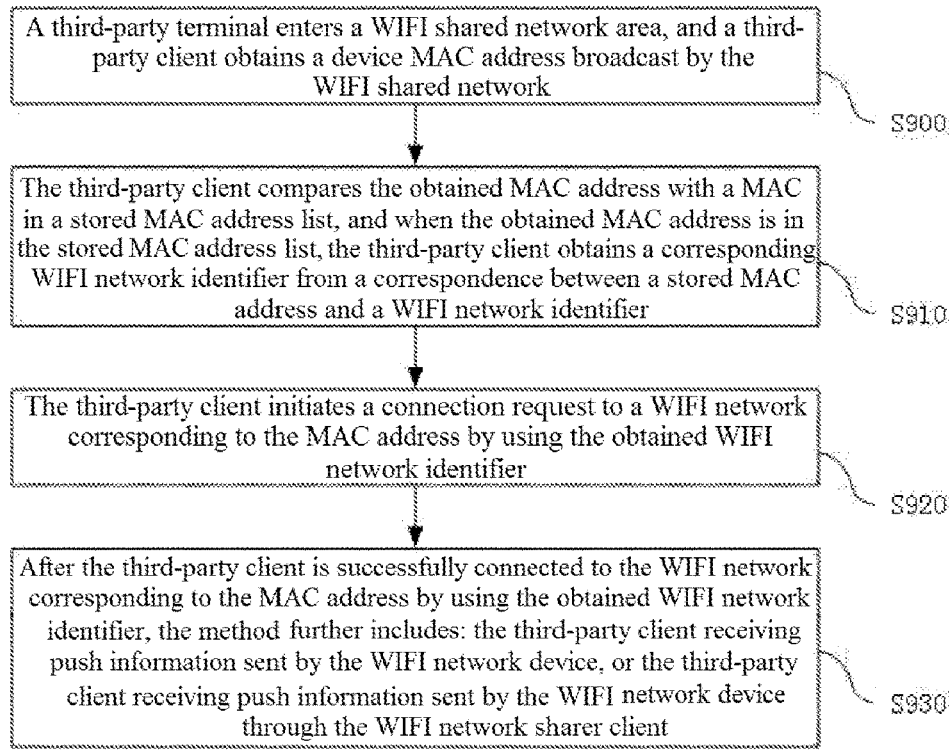
FIG. 9 is a flow chart of an embodiment of an information pushing method according to the present application.

The above embodiment describes how to configure the timing of information pushing to be associated with the establishment of a specific connection. A method of a third-party terminal connecting to a shared network and receiving push information when entering the shared network in the present application is described below with reference to FIG. 9:

S900: A third-party terminal enters a WIFI shared network area, and a third-party client obtains a device MAC address broadcast by the WIFI shared network.

An application may be installed in the third-party client, to facilitate communication of the WIFI sharer and the server of the network platform. The application may be, for example, an application installed on an operating system of the terminal, or a web page. The third-party client may mainly refer to a terminal in which an application is installed or a terminal capable of opening a web page to implement the similar function.

The third-party terminal may obtain information of a location where it is located by using a positioning system thereof such as a satellite positioning system or a base station positioning system. In this way, in a case that a coverage is preset for the WIFI network device, the third-party terminal may enter the coverage of the WIFI network device by using the positioning system.

The third-party terminal, when starting the WIFI function, can scan and receive a broadcast wireless signal, and can obtain a MAC address of the WIFI network device from the broadcast signal.

S910: The third-party client compares the obtained MAC address with a MAC in a stored MAC address list, and when the obtained MAC address is in the stored MAC address list, the third-party client obtains a corresponding WIFI network identifier from a correspondence between a stored MAC address and a WIFI network identifier.

The third-party client may obtain and store the WIFI network list and the correspondence between the MAC address and a WIFI identifier from the server in advance, and then store the same in the third-party client; or when the third-party terminal enters the WIFI shared network area, the third-party client sends a geographical location to the server, the server sends, according to the geographical location of the third-party client, a MAC address list of an area where the third-party client is located and a correspondence between a MAC address and a WIFI network identifier to the third-party client, and the third-party client stores the MAC address list and the correspondence between a MAC address and a WIFI network identifier.

S920: The third-party client initiates a connection request to a WIFI network corresponding to the MAC address by using the obtained WIFI network identifier.

S930: After the third-party client is successfully connected to the WIFI network corresponding to the MAC address by using the obtained WIFI network identifier, the method further includes: the third-party client receiving push information sent by the WIFI network device, or the third-party client receiving push information sent by the WIFI network device through the WIFI network sharer client.

With reference to the methods in FIG. 1 to FIG. 8, the WIFI shared network may not configure a connection key, and meanwhile may choose not to broadcast the SSID. In this way, when the third-party terminal enters the coverage area of the WIFI network, the SSID is unknown, and therefore, the WIFI shared network cannot be directly connected, thereby being capable of avoiding an unauthorized third-party terminal from accessing the WIFI shared network. According to the methods in FIG. 1 to FIG. 8, the third-party terminal may query a MAC address list stored therein through the received broadcast MAC address, to obtain a WIFI network identifier, that is, the SSID, such that the SSID is used to connect the WIFI network in the subsequent steps.

Figure 10:
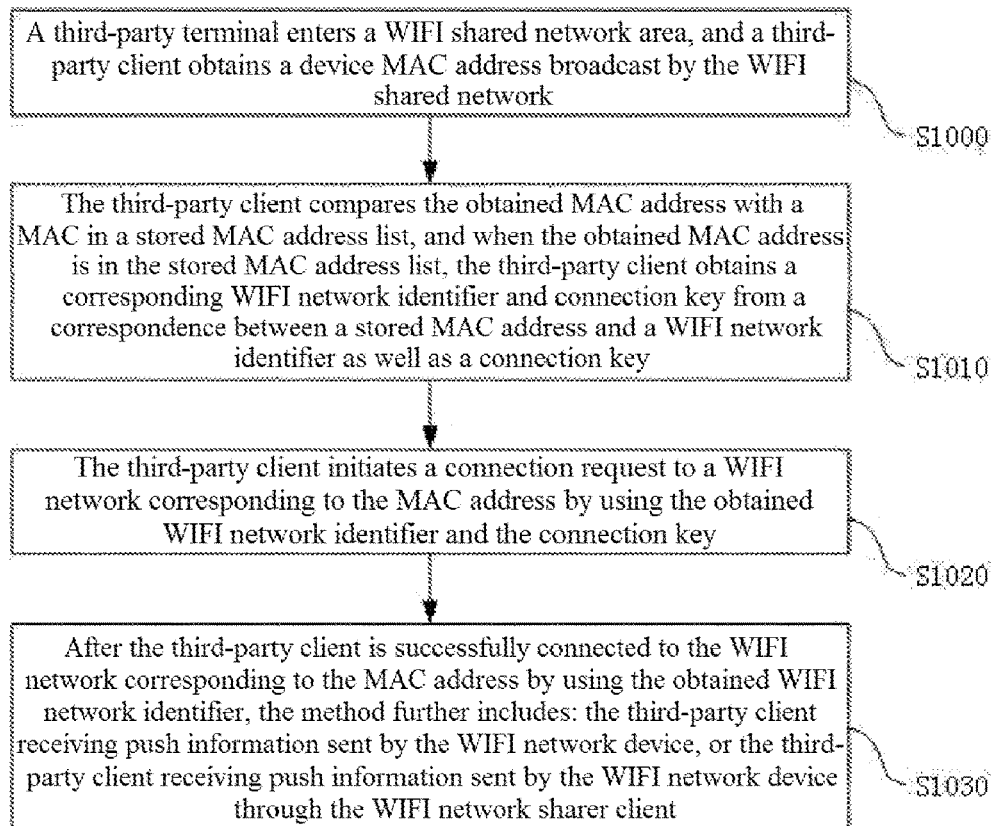
FIG. 10 is a flow chart of an embodiment of an information pushing method according to the present application.

The above embodiment describes how to configure the timing of information pushing to be associated with the establishment of a specific connection. A method of a third-party terminal connecting to a shared network and receiving push information when entering the shared network in the present application is described below with reference to FIG. 10:

S1000: A third-party terminal enters a WIFI shared network area, and a third-party client obtains a device MAC address broadcast by the WIFI shared network.

An application may be installed in the third-party client, to facilitate communication of the WIFI sharer and the server of the network platform. The application may be, for example, an application installed on an operating system of the terminal, or a web page. The third-party client may mainly refer to a terminal in which an application is installed or a terminal capable of opening a web page to implement the similar function.

S1010: The third-party client compares the obtained MAC address with a MAC in a stored MAC address list, and when the obtained MAC address is in the stored MAC address list, the third-party client obtains a corresponding WIFI network identifier and connection key from a correspondence between a stored MAC address and a WIFI network identifier as well as a connection key.

The third-party client may obtain and store the WIFI network list and the correspondence between the MAC address and a WIFI identifier from the server in advance, and then store the same in the third-party client; or when the third-party terminal enters the WIFI shared network area, the third-party client sends a geographical location to the server, the server sends, according to the geographical location of the third-party client, a MAC address list of an area where the third-party client is located and a correspondence between a MAC address and a WIFI network identifier to the third-party client, and the third-party client stores the MAC address list and the correspondence between a MAC address and a WIFI network identifier.

Similarly, the connection key may also be obtained from the third-party client in advance and then stored, for example, obtained from the server together with the MAC address list and then stored; also, when the third-party terminal enters the WIFI shared network area, the third-party client sends a geographical location to the server, the server may send, according to the geographical location of the third-party client, a connection key corresponding to a MAC address of an area where the third-party client is located to the third-party client, and the third-party client may store the connection key corresponding to the MAC address.

S1020: The third-party client initiates a connection request to a WIFI network corresponding to the MAC address by using the obtained WIFI network identifier and the connection key.

S1030: After the third-party client is successfully connected to the WIFI network corresponding to the MAC address by using the obtained WIFI network identifier, the method further includes: the third-party client receiving push information sent by the WIFI network device, or the third-party client receiving push information sent by the WIFI network device through the WIFI network sharer client.

The above embodiment describes how to configure the timing of information pushing to be associated with the establishment of a specific connection. A method of a third-party terminal connecting to a shared network and receiving push information when entering the shared network in the present application is described below with reference to FIG. 11:

S1100: A third-party terminal enters a WIFI shared network area, and a third-party client obtains a first set of device MAC addresses broadcast by the WIFI shared network.

S1110: The third-party client compares the obtained first set of MAC addresses with a second set of MAC addresses in a stored MAC address list in the same WIFI network shared area, and when the number of MAC addresses in an intersection reaches or exceeds a predetermined number, the third-party client obtains WIFI network identifiers corresponding to the MAC addresses in the intersection from a correspondence between a stored MAC address and a WIFI network identifier.

S1120: The third-party client initiates a connection request to a WIFI network corresponding to the MAC address by using at least one of the obtained WIFI network identifiers.

S1130: After the third-party client is successfully connected to the WIFI network corresponding to the MAC address, the method further includes:

the third-party client receiving push information sent by the connected WIFI network device/WIFI network sharer client.

The above embodiment describes how to configure the timing of information pushing to be associated with the establishment of a specific connection. A method of a third-party terminal connecting to a shared network and receiving push information when entering the shared network in the present application is described below with reference to FIG. 12:

S1200: A third-party terminal enters a WIFI shared network area, and a third-party client obtains a first set of device MAC addresses broadcast by the WIFI shared network.

S1210: The third-party client compares the obtained first set of MAC addresses with a second set of MAC addresses in a stored MAC address list, and when the number of MAC addresses in an intersection reaches or exceeds a predetermined number, the third-party client obtaining WIFI network identifiers and connection keys corresponding to the MAC addresses in the intersection from a correspondence between a stored MAC address and a WIFI network identifier as well as a connection key.

S1220: The third-party client initiates a connection request to a WIFI network corresponding to the MAC address by using at least one pair of the obtained WIFI network identifiers and connection keys.

S1230: After the third-party client is successfully connected to the WIFI network corresponding to the MAC address by using the obtained WIFI network identifier, the method further includes:

the third-party client receiving push information sent by the connected WIFI network device/WIFI network sharer client/server.

Figure 11:
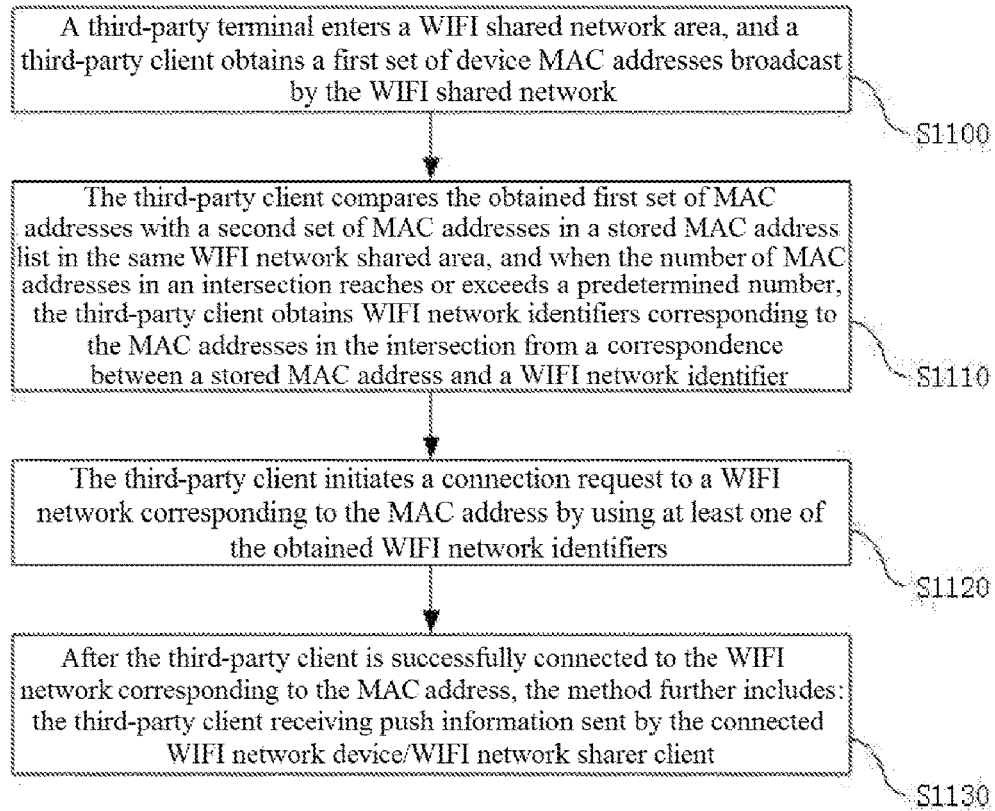
FIG. 11 is a flow chart of an embodiment of an information pushing method according to the present application.
Figure 12:
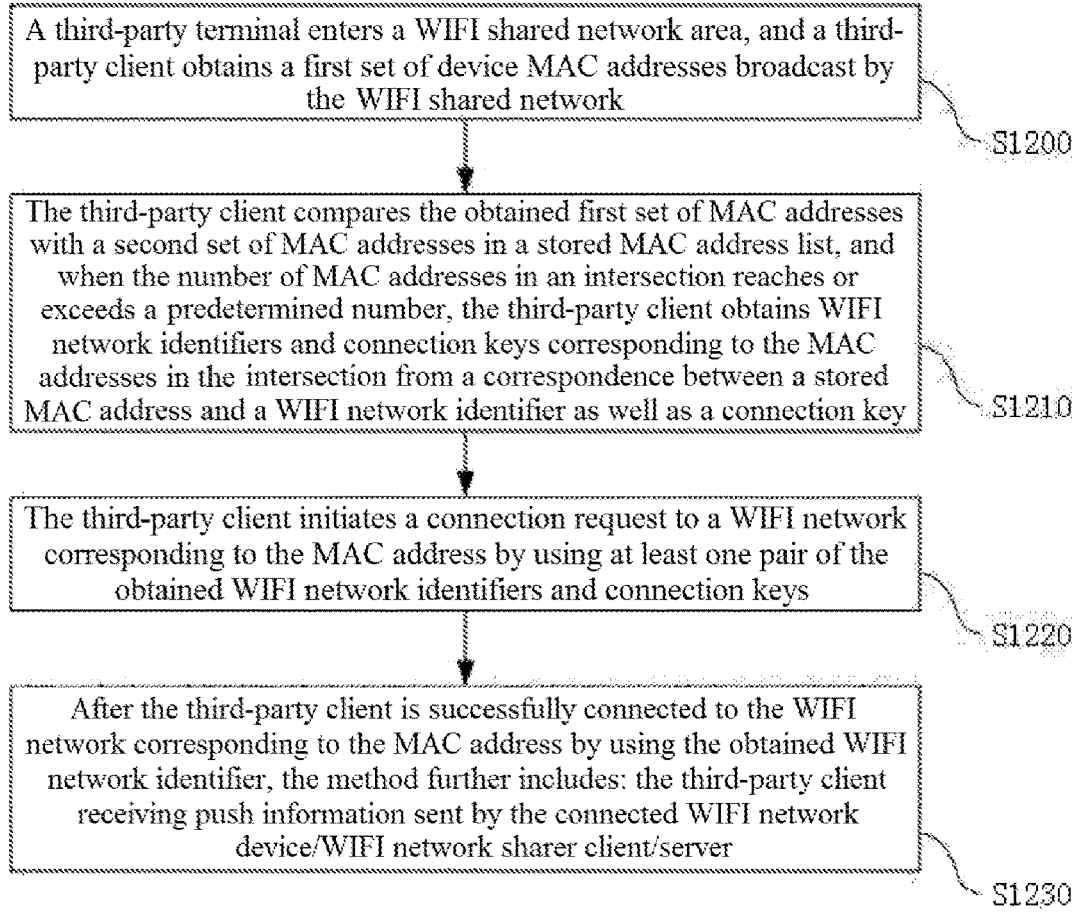
FIG. 12 is a flow chart of an embodiment of an information pushing method according to the present application.

In the methods shown in FIG. 11 and FIG. 12, the MAC address list and the correspondence between a MAC address and a WIFI network identifier stored in the third-party client may include:

a WIFI network list and a correspondence between a MAC address and a WIFI network identifier acquired by the third-party client from the server and stored in advance;

or, when the third-party terminal enters the WIFI shared network area, the third-party client sending a geographical location to the server, the server sending, according to the geographical location of the third-party client, a MAC address list of an area where the third-party client is located and a correspondence between a MAC address and a WIFI network identifier to the third-party client, and then the third-party client storing the MAC address list and the correspondence between a MAC address and a WIFI network identifier.

In the method shown in FIG. 12, the connection key stored in the third-party client may include:

a connection key acquired by the third-party client from the server and stored in advance;

or, when the third-party terminal enters the WIFI shared network area, the third-party client sending a geographical location to the server, the server sending, according to the geographical location of the third-party client, a connection key corresponding to a MAC address of an area where the third-party client is located to the third-party client, and then the third-party client storing the connection key corresponding to the MAC address.

Figure 13:
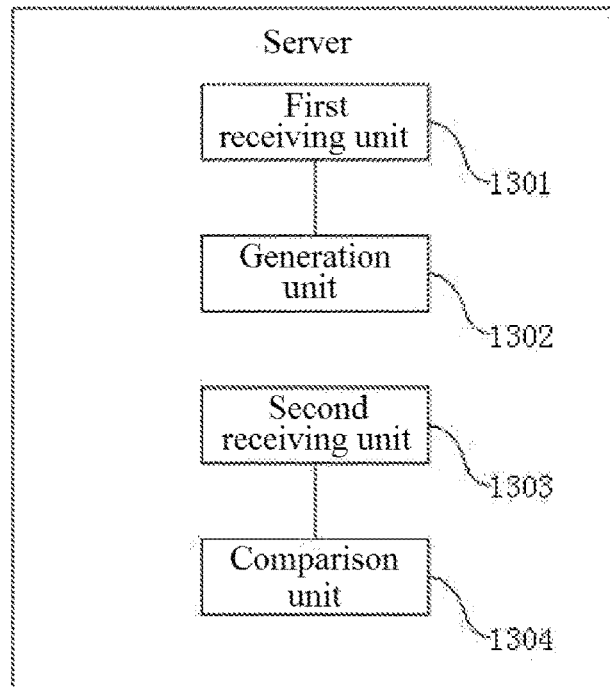
FIG. 13 is a block diagram of an embodiment of a server for information pushing according to the present application.

A server is introduced in the following, which, as shown in FIG. 13, may include:

a first receiving unit 1301, configured to receive a first identifier of a selected wireless network sent by a wireless network sharer client;

a generation unit 1302, configured to generate a second identifier and send the same to the wireless network sharer client;

a second receiving unit 1303, configured to receive a third identifier of the selected wireless network sent by the wireless network sharer client; and a comparison unit 1304, configured to compare the second identifier with the third identifier, allow successful authentication when the two identifiers are consistent, and register information about the devices of the wireless network.

A server is introduced in the following, which may include:

a first receiving unit 1301, configured to receive a first identifier of a selected wireless network sent by a wireless network sharer client and a MAC address of a corresponding wireless network device;

a generation unit 1302, configured to generate a second identifier and send the same to the wireless network sharer client;

a second receiving unit 1303, configured to receive a third identifier of the selected wireless network sent by the wireless network sharer client and a MAC address of a corresponding wireless network device; and a comparison unit 1304, configured to compare the second identifier with the third identifier, compare the MAC address of the wireless network device corresponding to the first identifier with the MAC address of the wireless network device corresponding to the third identifier, and allow successful authentication when the comparison results are consistent.

Figure 14:
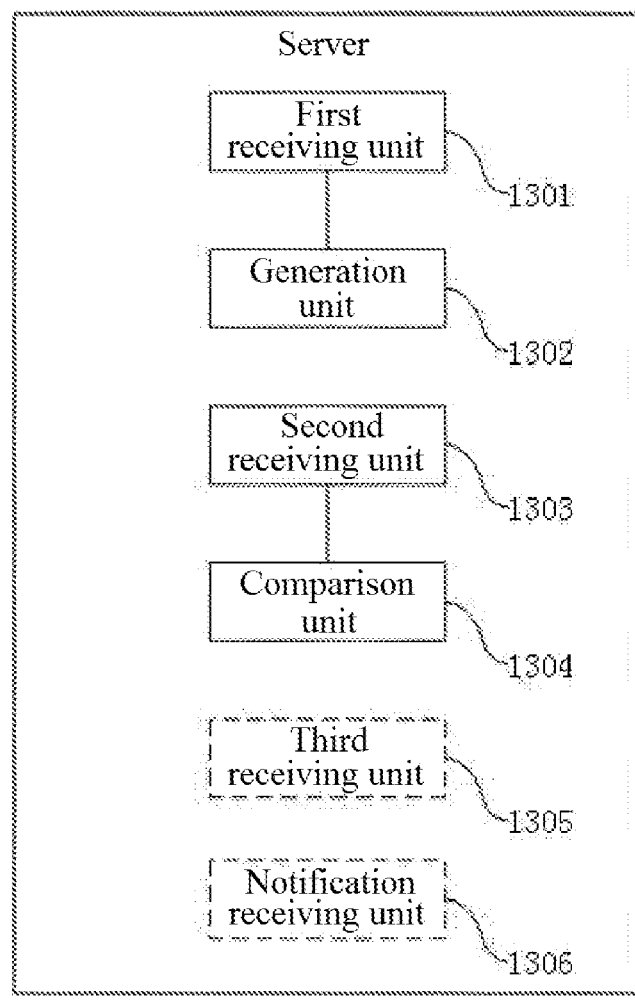
FIG. 14 is a block diagram of an embodiment of a server for information pushing according to the present application.

Further, the server shown in FIG. 13, as shown in FIG. 14, may also include:

a third receiving unit 1305, configured to receive push information sent by the wireless network sharer client; and a notification receiving unit 1306, configured to receive the following notification: the server sending the push information to a third-party terminal upon reception of a message indicating successful access of the third-party terminal to the wireless network.

Figure 15:
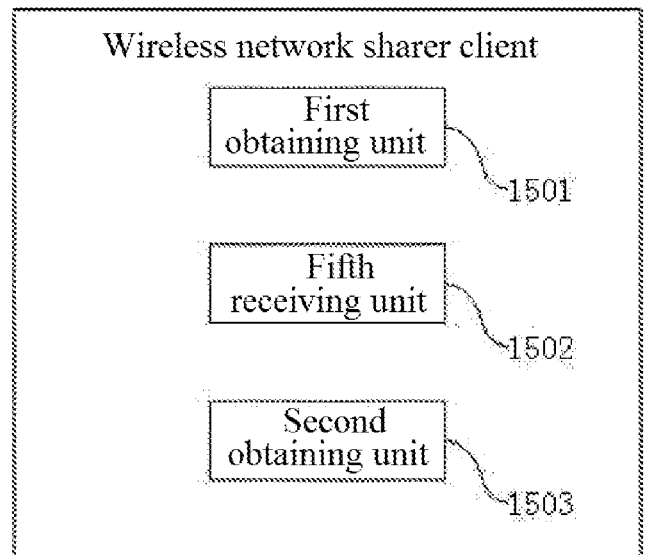
FIG. 15 is a block diagram of an embodiment of a wireless network sharer client for information pushing according to the present application.

A wireless network sharer client is introduced in the following, which, as shown in FIG. 15, may include:

a first obtaining unit 1501, configured to obtain a first identifier of a wireless network selected from a wireless network list scanned/stored by a wireless network sharer terminal, and send the same to a server;

a fifth receiving unit 1502, configured to receive a second identifier sent by the server; and a second obtaining unit 1503, configured to obtain a wireless network list updated by a wireless network sharer mobile terminal and send a third identifier of the selected wireless network in the list to the server.

A wireless network sharer client is introduced in the following, which may include:

a first obtaining unit 1501, configured to obtain a first identifier of a wireless network selected from a wireless network list scanned/stored by a wireless network sharer terminal and a MAC address of a corresponding wireless network device, and send the same to a server;

a fifth receiving unit 1502, configured for the wireless network sharer client to receive a second identifier sent by the server and a MAC address of a corresponding wireless network device; and a second obtaining unit 1503, configured to obtain a wireless network list updated by a wireless network sharer mobile terminal and send a third identifier of the selected wireless network in the list and a MAC address of a corresponding wireless network device to the server.

Figure 16:
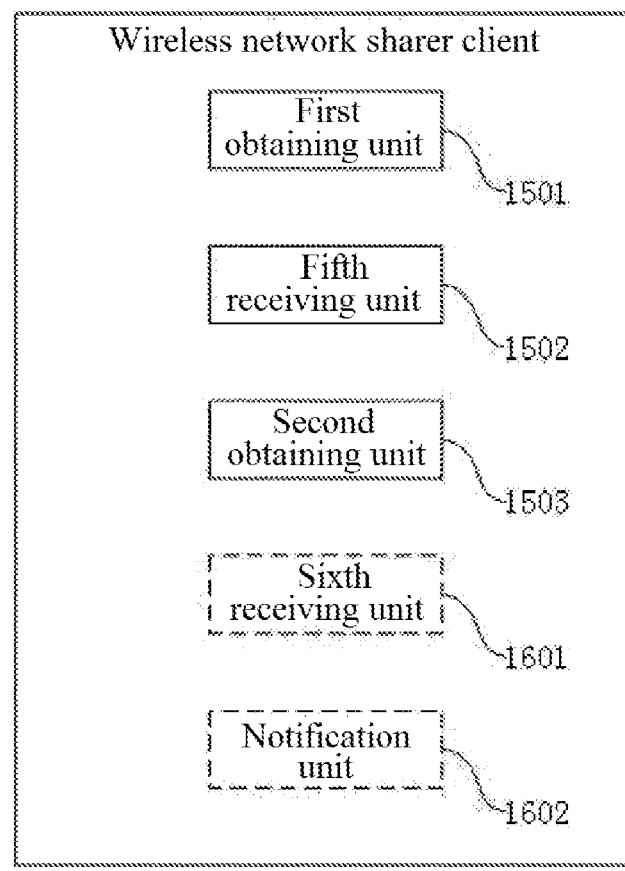
FIG. 16 is a block diagram of an embodiment of a wireless network sharer client for information pushing according to the present application.

Further, the wireless network sharing client shown in FIG. 15, as shown in FIG. 16, may also include:

a sixth receiving unit 1601, configured to receive the following configuration: sending push information to a third-party terminal upon reception of a message indicating successful access of the third-party terminal to the wireless network, or, a notification unit 1602, configured to send push information to the server, and notify the server to send the push information to a third-party terminal upon reception of a message indicating successful access of the third-party terminal to the wireless network.

Figure 17:
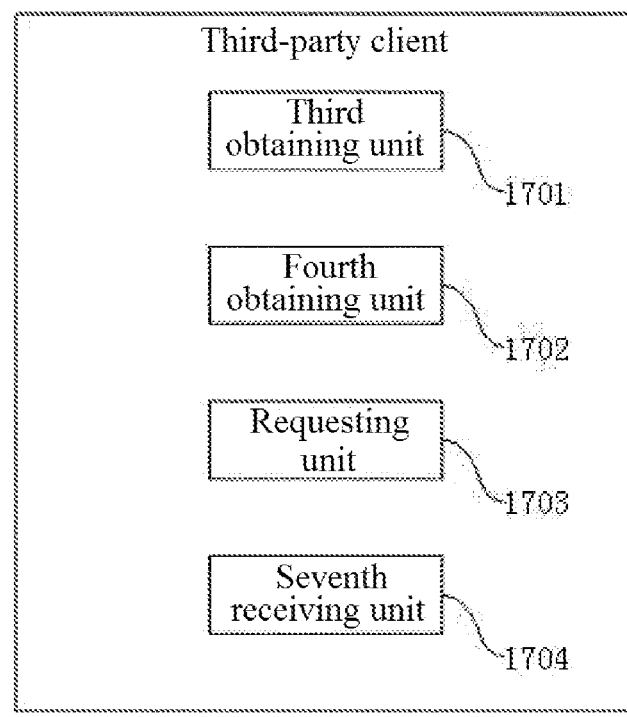
FIG. 17 is a block diagram of an embodiment of a third-party client for information pushing according to the present application.

A third-party client is introduced in the following, which, as shown in FIG. 17, may include:

a third obtaining unit 1701, configured to, when a third-party terminal enters a wireless shared network area, obtain a device MAC address broadcast by the wireless shared network;

a fourth obtaining unit 1702, configured to compare the obtained MAC address with a MAC address in a stored MAC address list, and when the obtained MAC address is in the stored MAC address list, obtain a corresponding wireless network identifier from a correspondence between a stored MAC address and a wireless network identifier;

a requesting unit 1703, configured to initiate a connection request to a wireless network corresponding to the MAC address by using the obtained wireless network identifier; and a seventh receiving unit 1704, configured to receive push information sent by the connected wireless network device/wireless network sharer client/server.

A third-party client is introduced in the following, which may include:

a third obtaining unit 1701, configured to, when a third-party terminal enters a wireless shared network area, obtain a device MAC address broadcast by the wireless shared network;

a fourth obtaining unit 1702, configured to compare the obtained MAC address with a MAC address in a stored MAC address list, and when the obtained MAC address is in the stored MAC address list, the third-party client obtaining a corresponding wireless network identifier and connection key from a correspondence between a stored MAC address and a wireless network identifier as well as a connection key;

a requesting unit 1703, configured to initiate a connection request to a wireless network corresponding to the MAC address by using the obtained wireless network identifier and connection key; and a seventh receiving unit 1704, configured to receive push information sent by the connected wireless network device/wireless network sharer client/server.

A third-party client is introduced in the following, which may include:

a third obtaining unit 1701, configured to, when a third-party terminal enters a wireless shared network area, obtain a first set of device MAC addresses broadcast by the wireless shared network;

a fourth obtaining unit 1702, configured to compare the obtained first set of MAC addresses with a second set of MAC addresses in a stored MAC address list in the same wireless network shared area, and when the number of MAC addresses in an intersection reaches or exceeds a predetermined number, the third-party client obtaining wireless network identifiers corresponding to the MAC addresses in the intersection from a correspondence between a stored MAC address and a wireless network identifier;

a requesting unit 1703, configured to initiate a connection request to a wireless network corresponding to the MAC address by using at least one of the obtained wireless network identifiers; and a seventh receiving unit 1704, configured to receive push information sent by the connected wireless network device/wireless network sharer client/server.

A third-party client is introduced in the following, which may include:

a third obtaining unit 1701, configured to, when a third-party terminal enters a wireless shared network area, obtain a first set of device MAC addresses broadcast by the wireless shared network;

a fourth obtaining unit 1702, configured to compare the obtained first set of MAC addresses with a second set of MAC addresses in a stored MAC address list, and when the number of MAC addresses in an intersection reaches or exceeds a predetermined number, the third-party client obtaining wireless network identifiers and connection keys corresponding to the MAC addresses in the intersection from a correspondence between a stored MAC address and a wireless network identifier as well as a connection key;

a requesting unit 1703, configured to initiate a connection request to a wireless network corresponding to the MAC address by using at least one pair of the obtained wireless network identifiers and corresponding connection keys; and a seventh receiving unit 1704, configured to receive push information sent by the connected wireless network device/wireless network sharer client/server.

In the 1990s, an improvement on a technology may be obviously distinguished as an improvement on hardware (for example, an improvement on a circuit structure such as a diode, a transistor, and a switch) or an improvement on software (an improvement on a method procedure). However, with the development of technologies, improvements of many method procedures at present may be considered as direct improvements on hardware circuit structures. Almost all designers program the improved method procedures into hardware circuits to obtain corresponding hardware circuit structures. Therefore, it cannot be assumed that the improvement of a method procedure cannot be implemented by using a hardware entity module. For example, a Programmable Logic Device (PLD) (for example, a Field Programmable Gate Array (FPGA)) is such an integrated circuit, and logic functions thereof are determined by a user programming devices. Designers program by themselves to "integrate" a digital system into a piece of PLD, without inviting a chip manufacturer to design and manufacture a dedicated integrated circuit chip 2. Moreover, at present, instead of manually manufacturing an integrated circuit chip, this programming is mostly implemented by using "logic compiler" software, which is similar to a software complier used during development and writing of an application, and if previous original codes are to be compiled, the codes also need to be written by using a specific programming language, which is referred to as a Hardware Description Language (HDL). However, there is not only one HDL, but there are many types of HDL, such as ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, RHDL (Ruby Hardware Description Language). At present, VHDL (Very-High-Speed Integrated Circuit Hardware Description Language) and Verilog2 are most common. Persons skilled in the art should also know that a hardware circuit for implementing the logic method procedure may be easily obtained only by slightly logically programming the method procedure using the above several hardware description languages and programming it into an integrated circuit.

A controller may be implemented in any suitable manner. For example, the controller may be in the form of, for example, a microprocessor or a processor and a computer readable medium storing computer readable program codes (for example, software or firmware) executable by the (micro)processor, a logic gate, a switch, an Application Specific Integrated Circuit (ASIC), a programmable logic controller, and an embedded micro-controller. Examples of the controller include, but are not limited to, the following micro-controllers: ARC 625D, Atmel AT91SAM, Microchip PIC18F26K20, and Silicone Labs C8051F320. A memory controller may also be implemented as a part of the control logic of a memory.

Persons skilled in the art also know that, in addition to implementing the controller by using pure computer readable program codes, the method steps may be logically programmed to enable the controller to implement the same function in a form of a logic gate, a switch, an application specific integrated circuit, a programmable logic controller and an embedded micro-controller. Therefore, such a controller may be considered as a hardware component, and apparatuses included therein and used for implementing various functions may also be considered as structures inside the hardware component. Or, further, the apparatuses used for implementing various functions may be considered as both software modules for implementing the method and structures inside the hardware component.

The system, apparatus, module or unit illustrated in the above embodiments may be specifically implemented by using a computer chip or an entity, or a product having a certain function.

For ease of description, when the apparatus is described, it is divided into various units in terms of functions for respective descriptions. Definitely, when the present application is implemented, functions of the units may be implemented in the same or multiple software and/or hardware.

Based on the foregoing descriptions of the implementation manners, persons skilled in the art may clearly understand that the present application may be implemented by software plus a necessary universal hardware platform. Based on such an understanding, the technical solutions of the present application essentially or the part contributing to the prior art may be implemented in a form of a software product. The computer software product may be stored in a storage medium, such as a ROM/RAM, a magnetic disk and an optical disc, and includes several instructions for instructing a computer device (which may be a personal computer, a server, or a network device) to perform the methods described in the embodiments or some of the embodiments of the present application.

The embodiments in the specification are described progressively, identical or similar parts of the embodiments may be obtained with reference to each other, and each embodiment focuses on describing differences between the embodiment and other embodiments. Especially, the system embodiment is basically similar to the method embodiment, so that it is described simply; please refer to the description of the method embodiment for related content.

The present application may be applicable to various universal or dedicated computer system environments or configurations, such as, a personal computer, a server computer, a handheld device or a portable device, a tablet device, a multi-processor system, a microprocessor-based system, a set top box, a programmable consumer electronic device, a network PC, a microcomputer, a mainframe computer, and a distributed computing environment including any of the above systems or devices.

The present application may be described in a general context of a computer executable instruction executed by a computer, for example, a program module. Generally, the program module includes a routing, a program, an object, an assembly, a data structure, and the like used for executing a specific task or implementing a specific abstract data type. The present application may also be implemented in a distributed computing environment, and in the distributed computer environment, a task is executed by using remote processing devices connected through a communications network. In the distributed computer environment, the program module may be located in a local and remote computer storage medium including a storage device.

Although the present application is described through embodiments, persons of ordinary skill in the art should know that the present application has many variations and changes without departing from the spirit of the present application, and it is expected that the appended claims cover the variations and changes without departing from the spirit of the present application.

The invention claimed is:
1. An information pushing method, comprising:
when a third-party terminal enters a wireless network coverage area, obtaining, by the third-party terminal, a first set of device media access control (MAC) addresses broadcasted by a wireless network;

comparing, by the third-party terminal, the obtained first set of MAC addresses with a second set of MAC addresses in a MAC address list stored on the third-party terminal, and when a number of common MAC addresses in the first and second sets reaches a predetermined number, obtaining, by the third-party terminal, wireless network identifiers corresponding to the common MAC addresses from correspondence relationships between MAC addresses and wireless network identifiers;

initiating, by the third-party terminal, a connection request to a wireless network corresponding to the common MAC addresses by using at least one of the obtained wireless network identifiers; and in response to that the third-party terminal is successfully connected to the wireless network corresponding to the common MAC addresses by using the obtained wireless network identifier according to which the connection request is initiated, receiving, by the third-party terminal, push information sent by a network device, a terminal, or a server.

2. The method according to claim 1, wherein the wireless network identifiers are SSID (Service Set Identifier) of the wireless network.

3. The method according to claim 1, wherein the wireless network has been authenticated by the server.

4. The method of claim 1, wherein:
obtaining, by the third-party terminal, the wireless network identifiers corresponding to the common MAC addresses from the correspondence relationships between MAC addresses and wireless network identifiers comprises: obtaining, by the third-party terminal, the wireless network identifiers and a connection key corresponding to the common MAC addresses from the correspondence relationships between MAC addresses, wireless network identifiers, and connection keys; and initiating, by the third-party terminal, the connection request to the wireless network corresponding to the common MAC addresses by using the at least one of the obtained wireless network identifiers comprises: initiating, by the third-party terminal, the connection request to the wireless network corresponding to the common MAC addresses by using the at least one of the obtained wireless network identifiers and connection key.

5. The method according to claim 4, wherein the connection keys are obtained by the third-party terminal from the server and are stored in the third-party terminal.

6. The method according to claim 4, wherein:
the connection keys are sent by the server to the third-party terminal based on a geographical location and are stored in the third-party terminal; and
the geographical location is sent by the third-party terminal to the server when the third-party terminal enters the wireless network coverage area.

7. The method of claim 1, wherein:
obtaining, by the third-party terminal, the wireless network identifiers corresponding to the common MAC addresses from correspondence relationships between MAC addresses and wireless network identifiers comprises: obtaining, by the third-party terminal, the wireless network identifiers and connection keys corresponding to the common MAC addresses from correspondence relationships between MAC addresses, wireless network identifiers, and connection keys;

initiating, by the third-party terminal, the connection request to the wireless network corresponding to the common MAC addresses by using at least one of the obtained wireless network identifiers comprises: initiating, by the third-party terminal, the connection request to the wireless network corresponding to the common MAC addresses by using at least one pair of the obtained wireless network identifiers and corresponding connection keys; and in response to that the third-party terminal is successfully connected to the wireless network corresponding to the common MAC addresses by using the obtained wireless network identifier according to which the connection request is initiated, receiving, by the third-party terminal, push information sent by the network device, the terminal, or the server comprises: in response to that the third-party terminal is successfully connected to the wireless network corresponding to the common MAC addresses by using the wireless network identifier and the corresponding connection key according to which the connection request is initiated, receiving, by the third-party terminal, push information sent by the network device, the terminal, or the server.

8. The method according to claim 1, wherein the MAC address list and the correspondence relationships between the MAC addresses and the wireless network identifiers are obtained by the third-party terminal from the server and are stored in the third-party terminal.

9. The method according to claim 1, wherein:
the MAC address list and the correspondence relationships between the MAC addresses and the wireless network identifiers are sent by the server to the third-party terminal based on a geographical location and are stored in the third-party terminal; and
the geographical location is sent by the third-party terminal to the server when the third-party terminal enters the wireless network coverage area.

10. An apparatus comprising a processor and a non-transitory computer-readable storage medium storing instructions that, when executed by the processor, cause the apparatus to perform an information pushing method, the method comprising:
when the apparatus enters a wireless network coverage area, obtaining a first set of device media access control (MAC) addresses broadcasted by a wireless network;
comparing the obtained first set of MAC addresses with a second set of MAC addresses in a MAC address list stored on the apparatus, and when a number of common MAC addresses in the first and second sets reaches a predetermined number, obtaining wireless network identifiers and connection keys corresponding to the common MAC addresses from correspondence relationships between MAC addresses, wireless network identifiers, and connection keys;
initiating a connection request to the wireless network corresponding to the common MAC addresses by using at least one pair of the obtained wireless network identifiers and corresponding connection keys; and
in response to that the apparatus is successfully connected to the wireless network corresponding to the MAC address by using the at least one pair of the obtained wireless network identifiers and the corresponding connection keys according to which the connection request is initiated, the apparatus receiving push information sent by a network device, a terminal, or a server.

11. The apparatus according to claim 10, wherein the wireless network identifiers are SSID (Service Set Identifier) of the wireless network.

12. The apparatus according to claim 10, wherein the wireless network has been authenticated by the server.

13. The apparatus according to claim 10, wherein the connection keys are obtained by the apparatus from the server and are stored in the apparatus.

14. The apparatus according to claim 10, wherein:
the connection keys are sent by the server to the apparatus based on a geographical location and are stored in the apparatus; and
the geographical location is sent by the apparatus to the server when the apparatus enters the wireless network coverage area.

15. The apparatus according to claim 10, wherein the MAC address list and the correspondence relationships between the MAC addresses and the wireless network identifiers are obtained by the apparatus from the server and are stored in the apparatus.

16. The apparatus according to claim 10, wherein:
the MAC address list and the correspondence relationships between the MAC addresses and the wireless network identifiers are sent by the server to the apparatus based on a geographical location and are stored in the apparatus; and
the geographical location is sent by the apparatus to the server when the apparatus enters the wireless network coverage area.

17. An information pushing method, comprising:
when a third-party terminal enters a wireless network coverage area, obtaining, by the third-party terminal, a first set of device media access control (MAC) addresses broadcasted by a wireless network;
comparing, by the third-party terminal, the obtained first set of MAC addresses with a second set of MAC addresses in a MAC address list stored on the third-party terminal, and when a number of common MAC addresses in the first and second sets reaches a predetermined number, obtaining, by the third-party terminal, wireless network identifiers and connection keys corresponding to the common MAC addresses from correspondence relationships between MAC addresses, wireless network identifiers, and connection keys;
initiating, by the third-party terminal, a connection request to the wireless network corresponding to the common MAC addresses by using at least one pair of the obtained wireless network identifiers and corresponding connection keys; and
in response to that the third-party terminal is successfully connected to the wireless network corresponding to the common MAC addresses by using the at least one pair of the obtained wireless network identifiers and the corresponding connection keys according to which the connection request is initiated, receiving, by the third-party terminal, push information sent by a network device, a terminal, or a server.

18. A non-transitory computer-readable storage medium configured with instructions executable by one or more processors of a third-party terminal to cause the one or more processors to perform operations comprising:
when the third-party terminal enters a wireless network coverage area, obtaining a first set of device media access control (MAC) addresses broadcasted by a wireless network;
comparing the obtained first set of MAC addresses with a second set of MAC addresses in a MAC address list stored on the third-party terminal, and when a number of common MAC addresses in the first and second sets reaches a predetermined number, obtaining wireless network identifiers corresponding to the common MAC addresses from correspondence relationships between MAC addresses and wireless network identifiers;
initiating a connection request to a wireless network corresponding to the common MAC addresses by using at least one of the obtained wireless network identifiers; and
in response to that the third-party terminal is successfully connected to the wireless network corresponding to the common MAC addresses by using the obtained wireless network identifier according to which the connection request is initiated, receiving push information sent by a network device, a terminal, or a server.

19. The non-transitory computer-readable storage medium of claim 18, wherein:
obtaining wireless network identifiers corresponding to the common MAC addresses from the correspondence relationships between MAC addresses and wireless network identifiers comprises: obtaining wireless network identifiers and a connection key corresponding to the common MAC addresses from the correspondence relationships between MAC addresses, wireless network identifiers, and connection keys; and
initiating the connection request to the wireless network corresponding to the common MAC addresses by using the at least one of the obtained wireless network identifiers comprises: initiating connection request to the wireless network corresponding to the common MAC addresses by using the at least one of the obtained wire less network identifiers and connection key.

20. The non-transitory computer-readable storage medium of claim 19, wherein:
the connection keys are sent by the server to the third-party terminal based on a geographical location and are stored in the third-party terminal; and
the geographical location is sent by the third-party terminal to the server when the third-party terminal enters the wireless network coverage area.

\* \* \* \* \*